(12) United States Patent
Abedini et al.

(10) Patent No.: US 11,770,794 B2
(45) Date of Patent: Sep. 26, 2023

(54) INDICATION OF SYSTEM INFORMATION UPDATE VIA A DOWNLINK SHARED CHANNEL

(71) Applicant: QUALCOMM Incorporated, San Diego, CA (US)

(72) Inventors: Navid Abedini, Basking Ridge, NJ (US); Jianghong Luo, Skillman, NJ (US); Ozcan Ozturk, San Diego, CA (US); Wanshi Chen, San Diego, CA (US); Tao Luo, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/223,392

(22) Filed: Apr. 6, 2021

(65) Prior Publication Data

US 2021/0321361 A1 Oct. 14, 2021

Related U.S. Application Data

(60) Provisional application No. 63/008,535, filed on Apr. 10, 2020.

(51) Int. Cl.
*H04W 68/00* (2009.01)
*H04W 8/24* (2009.01)
(Continued)

(52) U.S. Cl.
CPC .......... *H04W 68/005* (2013.01); *H04W 8/08* (2013.01); *H04W 8/24* (2013.01); *H04W 24/10* (2013.01);
(Continued)

(58) Field of Classification Search
CPC ....... H04W 68/005; H04W 8/08; H04W 8/14; H04W 8/24; H04W 8/245; H04W 24/10;
(Continued)

(56) References Cited

U.S. PATENT DOCUMENTS

2018/0270738 A1 9/2018 Martinez Tarradell et al.
2018/0317198 A1 11/2018 Lee et al.
(Continued)

FOREIGN PATENT DOCUMENTS

CA 3081606 A1 * 5/2019 ............... H04B 7/02
GB 2568513 A 5/2019
(Continued)

OTHER PUBLICATIONS

International Search Report and Written Opinion—PCT/US2021/026124—ISA/EPO—dated Jul. 19, 2021.

*Primary Examiner* — Kevin D Mew
(74) *Attorney, Agent, or Firm* — Holland & Hart LLP

(57) ABSTRACT

Methods, systems, and devices for wireless communications are described. In some systems, a first device may be in communication with a second device and may receive, from the second device, DCI in a downlink control channel and a message in a downlink shared channel. The message in the downlink shared channel may include an indication of a system information update that is relevant to the first device and may include information relating to one or more system information parameters that are updated. The first device may determine the system information update based on the DCI and the indication in the message and may acquire system information accordingly. The first device may update the system information of the first device based on the acquired system information update and may communicate with the second device using the updated system information.

30 Claims, 18 Drawing Sheets

(51) Int. Cl.
*H04W 24/10* (2009.01)
*H04W 8/08* (2009.01)
*H04W 72/1263* (2023.01)
*H04W 72/23* (2023.01)
*H04W 72/53* (2023.01)

(52) U.S. Cl.
CPC ....... *H04W 72/1263* (2013.01); *H04W 72/23* (2023.01); *H04W 72/53* (2023.01)

(58) Field of Classification Search
CPC ......... H04W 72/0406; H04W 72/0413; H04W 72/042; H04W 72/0493; H04W 72/1263; H04W 72/1289
See application file for complete search history.

(56) References Cited

U.S. PATENT DOCUMENTS

| | | | |
|---|---|---|---|
| 2019/0223160 A1* | 7/2019 | He | H04W 68/005 |
| 2019/0306827 A1* | 10/2019 | Agiwal | H04L 5/001 |
| 2019/0320455 A1* | 10/2019 | Chen | H04W 48/12 |
| 2019/0349902 A1* | 11/2019 | Soriaga | H04W 64/00 |
| 2021/0045170 A1* | 2/2021 | Luo | H04W 88/14 |
| 2021/0068074 A1* | 3/2021 | He | H04W 72/042 |
| 2021/0168719 A1* | 6/2021 | Sugiyama | H04W 52/0235 |
| 2021/0266877 A1* | 8/2021 | Soriaga | H04W 64/00 |
| 2022/0046523 A1* | 2/2022 | Nam | H04W 48/12 |

FOREIGN PATENT DOCUMENTS

| | | | | |
|---|---|---|---|---|
| GB | 2574852 A * | 12/2019 | | H04W 74/006 |
| WO | WO-2015143244 A1 * | 9/2015 | | H04W 16/24 |
| WO | WO-2017074042 A1 | 5/2017 | | |
| WO | WO-2019083277 A1 * | 5/2019 | | H04W 72/04 |
| WO | WO-2019223625 A1 | 11/2019 | | |
| WO | WO-2020032659 A1 * | 2/2020 | | H04L 5/0053 |

* cited by examiner

INDICATION OF SYSTEM INFORMATION UPDATE VIA A DOWNLINK SHARED CHANNEL

CROSS REFERENCE

The present Application for Patent claims the benefit of U.S. Provisional Patent Application No. 63/008,535 by Abedini et al., entitled "INDICATION OF SYSTEM INFORMATION UPDATE VIA A DOWNLINK SHARED CHANNEL," filed Apr. 10, 2020, assigned to the assignee hereof, and expressly incorporated by reference herein.

FIELD OF TECHNOLOGY

The following relates generally to wireless communications and more specifically to indication of system information update via a downlink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station, such as a parent integrated access and backhaul (IAB) node, may provide system information to a number of connected devices to enable the devices for communication with the base station.

SUMMARY

The described techniques relate to improved methods, systems, devices, and apparatuses that support indication of system information update via a downlink shared channel. Generally, the described techniques provide a device in a system with an indication of a system information update in a message carried over a downlink shared channel. For example, a base station, such as a parent integrated access and backhaul (IAB) node, may transmit, to a device, an indication of a system information update in a message that is carried over a downlink shared channel. To facilitate acquisition of updated system information amongst connected devices, the base station may provide an indication of a system information update to all of the connected devices in the system via a message. More efficient techniques for providing an indication of a system information update to a number of connected devices are desired. In some examples, the message including the indication of the system information update may be a paging message and, as such, the techniques described herein may provide for an indication of a system information update to be transmitted, from the base station to the device, in a paging message carried by a downlink shared channel.

The message in the downlink shared channel may include a variety of indications or parameters associated with a system information update for the device, including a flag indicating that updated system information is available for the device, an indication of a number of system information blocks (SIBs) including updated parameters, an indication of a number of information elements (IEs) including updated parameters, or any combination thereof. Additionally or alternatively, the message may include an indication of the updated parameters. In other words, the message may indicate which parameters are updated and, in some implementations, indicate a value in a payload of the downlink shared channel corresponding to the updated parameters.

In some implementations, the base station may provide the indication of the system information update in the message in the downlink shared channel as a standalone indication that the device may use to determine that system information associated with the device has been updated. In some implementations, the base station may provide the indication of the system information update in the downlink shared channel and may provide a second indication of the system information update in a downlink control channel. In some examples, for instance, the base station may transmit, to the device, the second indication of the system information update in downlink control information (DCI), where the second indication may inform the device that system information associated with the device has been updated and that the device may expect to receive additional information relating to the system information update in the message in the downlink shared channel. In either implementation, the device may update the system information of the device based on the indication of the system information update in the message carried by the downlink shared channel, or the DCI, or other signaling, or any combination thereof, and may communicate with the base station using the updated system information.

A method of wireless communication at a first device is described. The method may include establishing a communication link with a second device, receiving, from the second device based on establishing the communication link, DCI in a downlink control channel and a message in a downlink shared channel, the message including an indication of a system information update for the first device, determining the system information update for the first device based on receiving the DCI and the indication of the system information update in the message, updating the system information for the first device based on determining the system information update, and communicating with the second device based on updating the system information.

An apparatus for wireless communication at a first device is described. The apparatus may include a processor, memory coupled with the processor, and instructions stored in the memory. The instructions may be executable by the processor to cause the apparatus to establish a communication link with a second device, receive, from the second device based on establishing the communication link, DCI in a downlink control channel and a message in a downlink shared channel, the message including an indication of a system information update for the first device, determine the system information update for the first device based on receiving the DCI and the indication of the system information update in the message, update the system information for the first device based on determining the system information update, and communicate with the second device based on updating the system information.

Another apparatus for wireless communication at a first device is described. The apparatus may include means for establishing a communication link with a second device, receiving, from the second device based on establishing the communication link, DCI in a downlink control channel and a message in a downlink shared channel, the message including an indication of a system information update for the first device, determining the system information update for the first device based on receiving the DCI and the indication of the system information update in the message, updating the system information for the first device based on determining the system information update, and communicating with the second device based on updating the system information.

A non-transitory computer-readable medium storing code for wireless communication at a first device is described. The code may include instructions executable by a processor to establish a communication link with a second device, receive, from the second device based on establishing the communication link, DCI in a downlink control channel and a message in a downlink shared channel, the message including an indication of a system information update for the first device, determine the system information update for the first device based on receiving the DCI and the indication of the system information update in the message, update the system information for the first device based on determining the system information update, and communicate with the second device based on updating the system information.

In some examples of the method, apparatuses, and non-transitory computer-readable medium described herein, receiving the indication of the system information update in the message may include operations, features, means, or instructions for receiving a flag of one or more bits.

In some examples of the method, apparatuses, and non-transitory computer-readable medium described herein, receiving the indication of the system information update may include operations, features, means, or instructions for receiving an indication of one or more SIBs updated.

In some examples of the method, apparatuses, and non-transitory computer-readable medium described herein, receiving the indication of the system information update may include operations, features, means, or instructions for receiving an indication of one or more system IEs updated.

In some examples of the method, apparatuses, and non-transitory computer-readable medium described herein, receiving the indication of the one or more system IEs updated may include operations, features, means, or instructions for receiving an indication that the one or more system IEs updated may be associated with a set of SIBs.

In some examples of the method, apparatuses, and non-transitory computer-readable medium described herein, the one or more system IEs updated may be associated with a cell selection parameter, a cell re-selection parameter, a cell measurement parameter, or any combination thereof.

In some examples of the method, apparatuses, and non-transitory computer-readable medium described herein, receiving the indication of the system information update may include operations, features, means, or instructions for receiving, in a payload on the shared channel, one or more system information parameters updated.

In some examples of the method, apparatuses, and non-transitory computer-readable medium described herein, the one or more system information parameters updated include one or more configuration parameters associated with a random access procedure.

In some examples of the method, apparatuses, and non-transitory computer-readable medium described herein, receiving the DCI may include operations, features, means, or instructions for receiving a second indication of the system information update, and where determining the system information update for the first device may be based on receiving the second indication of the system information update in the DCI.

In some examples of the method, apparatuses, and non-transitory computer-readable medium described herein, receiving the indication of the system information update for the first device in the message may include operations, features, means, or instructions for receiving a flag of one or more bits, receiving an indication of one or more SIBs updated, receiving an indication of one or more system IEs updated, or receiving, in a payload on the shared channel, one or more system information parameters updated, or any combination thereof.

In some examples of the method, apparatuses, and non-transitory computer-readable medium described herein, receiving the second indication of the system information update in the DCI may include operations, features, means, or instructions for receiving the indication of the system information update in a short message of the DCI.

In some examples of the method, apparatuses, and non-transitory computer-readable medium described herein, receiving the indication of the system information update may include operations, features, means, or instructions for receiving the indication of the system information update in a field in the message.

In some examples of the method, apparatuses, and non-transitory computer-readable medium described herein, receiving the indication of the system information update in the field in the message may include operations, features, means, or instructions for receiving an identifier associated with the field in the message, the identifier assigned to one or more devices in a group of devices including being assigned to the first device as one of the one or more devices in the group of devices, the method further including.

Some examples of the method, apparatuses, and non-transitory computer-readable medium described herein may further include operations, features, means, or instructions for determining that the identifier associated with the field in the message may be assigned to the first device may be based on a class of the first device, a category of the first device, a mobility of the first device, a capability of the first device, or any combination thereof.

In some examples of the method, apparatuses, and non-transitory computer-readable medium described herein, receiving the indication of the system information update in the field or a second field in the message may include operations, features, means, or instructions for receiving a second identifier associated with the field or the second field in the message, the second identifier assigned to one or more devices in a second group of devices including being assigned to the first device as one of the one or more devices in the second group of devices, the method further including.

In some examples of the method, apparatuses, and non-transitory computer-readable medium described herein, receiving the indication of the system information update may include operations, features, means, or instructions for receiving, in the message, an indication of one or more SIBs updated, an indication of one or more system IEs updated, one or more system information parameters updated, or any combination thereof, and receiving, in the DCI, a flag of one or more bits associated with the first device, an indication of a paging identifier associated with the first device, an indication of paging search space associated with the first device, an indication of one or more paging occasions associated with the first device, or any combination thereof.

In some examples of the method, apparatuses, and non-transitory computer-readable medium described herein, the flag, the indication of the paging identifier, the indication of the paging search space, the indication of the one or more paging occasions, or any combination thereof may be included in a short message of the DCI.

In some examples of the method, apparatuses, and non-transitory computer-readable medium described herein, the indication of the one or more paging occasions may be based on a state of the first device, the state of the first device including an idle state, an inactive state, or a connected state.

In some examples of the method, apparatuses, and non-transitory computer-readable medium described herein, the indication of the system information update in the downlink shared channel includes scheduling information associated with an updated system information message.

In some examples of the method, apparatuses, and non-transitory computer-readable medium described herein, the first device may be associated with a first type of devices associated with a first type of service different than a second type of devices associated with a second type of service.

In some examples of the method, apparatuses, and non-transitory computer-readable medium described herein, a type of a device may be based at least in part a class of the device, a category of the device, a mobility of the device, or a capability of the device, or any combination thereof.

In some examples of the method, apparatuses, and non-transitory computer-readable medium described herein, the message may be a paging message in the downlink shared channel; and where a field in the message associated with the indication of the system information update may be a paging record field.

In some examples of the method, apparatuses, and non-transitory computer-readable medium described herein, the first device may be a child IAB node or a user equipment and the second device may be a parent IAB node, a central unit, or a base station.

In some examples of the method, apparatuses, and non-transitory computer-readable medium described herein, the DCI schedules the message in the downlink shared channel.

A method of wireless communication at a second device is described. The method may include establishing a communication link with a group of devices, determining a system information update for a first device in the group of devices based on establishing the communication link, transmitting, to the first device based on determining the system information update, DCI in a downlink control channel and a message in a downlink shared channel, the message including an indication of a system information update for the first device, and communicating with the first device in the group of devices based on transmitting the DCI and the indication of the system information update in the message.

An apparatus for wireless communication at a second device is described. The apparatus may include a processor, memory coupled with the processor, and instructions stored in the memory. The instructions may be executable by the processor to cause the apparatus to establish a communication link with a group of devices, determine a system information update for a first device in the group of devices based on establishing the communication link, transmit, to the first device based on determining the system information update, DCI in a downlink control channel and a message in a downlink shared channel, the message including an indication of a system information update for the first device, and communicate with the first device in the group of devices based on transmitting the DCI and the indication of the system information update in the message.

Another apparatus for wireless communication at a second device is described. The apparatus may include means for establishing a communication link with a group of devices, determining a system information update for a first device in the group of devices based on establishing the communication link, transmitting, to the first device based on determining the system information update, DCI in a downlink control channel and a message in a downlink shared channel, the message including an indication of a system information update for the first device, and communicating with the first device in the group of devices based on transmitting the DCI and the indication of the system information update in the message.

A non-transitory computer-readable medium storing code for wireless communication at a second device is described. The code may include instructions executable by a processor to establish a communication link with a group of devices, determine a system information update for a first device in the group of devices based on establishing the communication link, transmit, to the first device based on determining the system information update, DCI in a downlink control channel and a message in a downlink shared channel, the message including an indication of a system information update for the first device, and communicate with the first device in the group of devices based on transmitting the DCI and the indication of the system information update in the message.

In some examples of the method, apparatuses, and non-transitory computer-readable medium described herein, transmitting the indication of the system information update in the message may include operations, features, means, or instructions for transmitting a flag of one or more bits.

In some examples of the method, apparatuses, and non-transitory computer-readable medium described herein, transmitting the indication of the system information update may include operations, features, means, or instructions for transmitting an indication of one or more SIBs updated.

In some examples of the method, apparatuses, and non-transitory computer-readable medium described herein, transmitting the indication of the system information update may include operations, features, means, or instructions for transmitting an indication of one or more system IEs updated.

In some examples of the method, apparatuses, and non-transitory computer-readable medium described herein, transmitting the indication of the one or more system IEs updated may include operations, features, means, or instructions for transmitting an indication that the one or more system IEs updated may be associated with a set of SIBs.

In some examples of the method, apparatuses, and non-transitory computer-readable medium described herein, the one or more system IEs updated may be associated with a cell selection parameter, a cell re-selection parameter, a cell measurement parameter, or any combination thereof.

In some examples of the method, apparatuses, and non-transitory computer-readable medium described herein, transmitting the indication of the system information update may include operations, features, means, or instructions for transmitting, in a payload on the shared channel, one or more system information parameters updated.

In some examples of the method, apparatuses, and non-transitory computer-readable medium described herein, the one or more system information parameters updated include one or more configuration parameters associated with a random access procedure.

In some examples of the method, apparatuses, and non-transitory computer-readable medium described herein, transmitting the DCI may include operations, features, means, or instructions for transmitting a second indication of the system information update, and where determining the system information update for the first device may be based on transmitting the indication of the system information update in the DCI.

In some examples of the method, apparatuses, and non-transitory computer-readable medium described herein, transmitting the indication of the system information update for the first device in the message may include operations, features, means, or instructions for transmitting a flag of one or more bits, transmitting an indication of one or more SIBs updated, transmitting an indication of one or more system IEs updated, or transmitting, in a payload on the shared channel, one or more system information parameters updated, or any combination thereof.

In some examples of the method, apparatuses, and non-transitory computer-readable medium described herein, transmitting the second indication of the system information update in the DCI may include operations, features, means, or instructions for transmitting the indication of the system information update in a short message of the DCI.

In some examples of the method, apparatuses, and non-transitory computer-readable medium described herein, transmitting the indication of the system information update may include operations, features, means, or instructions for transmitting the indication of the system information update in a field in the message.

In some examples of the method, apparatuses, and non-transitory computer-readable medium described herein, transmitting the indication of the system information update in the field in the message may include operations, features, means, or instructions for transmitting an identifier associated with the field in the message, the identifier assigned to one or more devices in a group of devices including being assigned to the first device as one of the one or more devices in the group of devices.

Some examples of the method, apparatuses, and non-transitory computer-readable medium described herein may further include operations, features, means, or instructions for determining that the identifier associated with the field may be assigned to the first device based on a class of the first device, a category of the first device, a mobility of the first device, a capability of the first device, or any combination thereof.

Some examples of the method, apparatuses, and non-transitory computer-readable medium described herein may further include operations, features, means, or instructions for transmitting a second identifier associated with the field or the second field in the message, the second identifier assigned to one or more devices in a second group of devices including being assigned to the first device as one of the one or more devices in the second group of devices.

In some examples of the method, apparatuses, and non-transitory computer-readable medium described herein, transmitting the indication of the system information update may include operations, features, means, or instructions for transmitting, in the message, an indication of one or more SIBs updated, an indication of one or more system IEs updated, one or more system information parameters updated, or any combination thereof, and transmitting, in the DCI, a flag of one or more bits associated with the first device, an indication of a paging identifier associated with the first device, an indication of paging search space associated with the first device, an indication of one or more paging occasions associated with the first device, or any combination thereof.

In some examples of the method, apparatuses, and non-transitory computer-readable medium described herein, the flag, the indication of the paging identifier, the indication of the paging search space, the indication of the one or more paging occasions, or any combination thereof may be included in a short message of the DCI.

In some examples of the method, apparatuses, and non-transitory computer-readable medium described herein, the indication of the one or more paging occasions may be based on a state of the first device, the state of the first device including an idle state, an inactive state, or a connected state.

In some examples of the method, apparatuses, and non-transitory computer-readable medium described herein, the indication of the system information update in the downlink shared channel includes scheduling information associated with an updated system information message.

In some examples of the method, apparatuses, and non-transitory computer-readable medium described herein, the first device may be associated with a first type of devices associated with a first type of service different than a second type of devices associated with a second type of service.

In some examples of the method, apparatuses, and non-transitory computer-readable medium described herein, a type of a device may be based at least in part a class of the device, a category of the device, a mobility of the device, or a capability of the device, or any combination thereof.

In some examples of the method, apparatuses, and non-transitory computer-readable medium described herein, the message may be a paging message in the downlink shared channel; and where a field in the message associated with the indication of the system information update may be a paging record field.

In some examples of the method, apparatuses, and non-transitory computer-readable medium described herein, the first device may be an IAB node or a user equipment and the second device may be a parent IAB node, a central unit, or a base station.

In some examples of the method, apparatuses, and non-transitory computer-readable medium described herein, the DCI schedules the message in the downlink shared channel.

DETAILED DESCRIPTION

Figure 1:
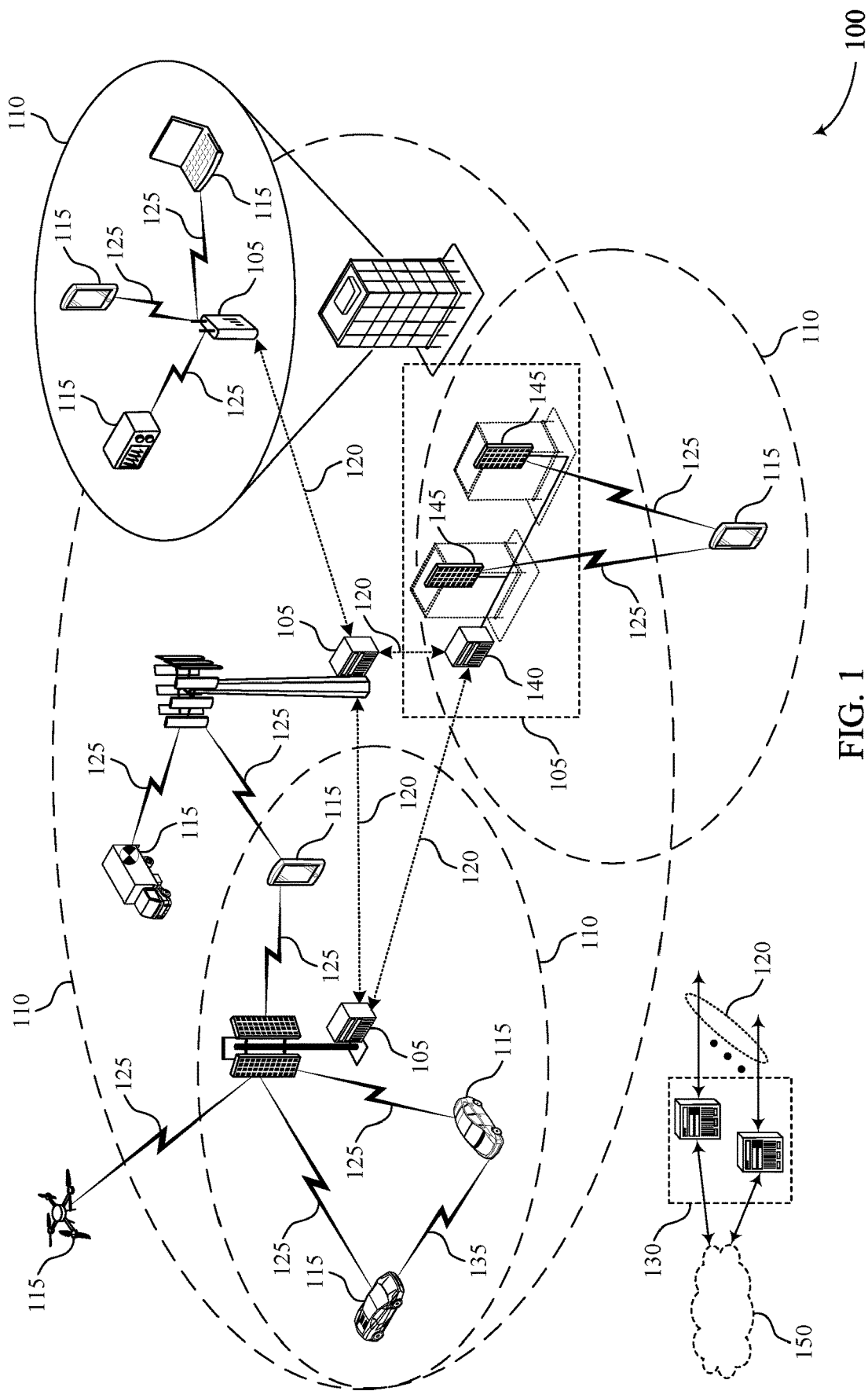
FIG. 1 illustrates an example of a wireless communications system that supports indication of system information update via a downlink shared channel in accordance with aspects of the present disclosure.

In some wireless communications systems, a device, which may be referred to as a second device, may allocate resources and schedule communication for a number of other devices, including a first device, that are in communication with (e.g., connected to) the second device. The second device may configure resource allocations and schedule communication between one or more of the connected devices and the second device by providing the connected devices with a number of system information parameters. To maintain up-to-date system information at the connected devices, the second device may transmit an indication (e.g., a message, a page) of a system information update to the connected devices to inform the connected devices when system information has changed and, based on receiving the indication, the connected devices may monitor for updated system information from the second device or that the indication may be accompanied by the updated system information from the second device.

In some examples, the connected devices may include devices of varying types, where different types of devices may be associated with different constraints (e.g., requirements) or different service requests. As such, different types of devices may be configured to use different system information parameters. The second device, however, may transmit the indication of the system information update to the connected devices regardless of which devices may be interested in the system information parameters that are updated. Further, some devices, such as a first group of devices, may use system information parameters that are updated frequently, while other devices, such as a second group of devices, may use system information parameters that are updated relatively infrequently. Yet, the second group of devices may nonetheless receive an indication of a system information update when a system information parameter is updated, such as a parameter used by the first group of devices, even though the updated system information parameters may be unnecessary or irrelevant to the operation of the second group of devices. Such unnecessary paging of the second group of devices may adversely affect the power-saving ability of the second group of devices (e.g., due to frequent unnecessary paging), which may hinder the capability and performance of the second group of devices.

In some examples of the present disclosure, the second device may transmit an indication of the system information update in a message (e.g., a paging message) in a downlink shared channel, such as a physical downlink shared channel (PDSCH). The message in the downlink shared channel may include a number of fields, and in some examples, each field may include a separate indication of a system information update. The fields may include an indication of a system information update associated with different system information parameters. Further, in some examples, each field may be associated with an identifier that may correspond to an identifier assigned to a connected device. Accordingly, a connected device, such as the first device, may receive the message and identify a number of fields in the message that include an indication of a system information update that is relevant to the first device, if any. As such, the first device may receive an indication of a system information update that is associated with one or more system information parameters that are relevant to the first device and, likewise, may avoid unnecessarily receiving an indication of a system information update that is associated with system information parameters that are irrelevant to the first device.

In some examples, a field in the message carried by the downlink shared channel may include a variety of indications or parameters associated with a system information update, such as an indication that a system information update is available, an indication of a number of system information blocks (SIBs) including updated parameters, an indication of a number of information elements (IEs) including updated parameters, or any combination thereof. Additionally or alternatively, a field in the message may include an indication of which parameters are updated. For example, the field may include an indication of the updated parameters and may, in some implementations, include the updated values of the updated parameters in a payload of the downlink shared channel.

Particular aspects of the subject matter described herein may be implemented to realize one or more potential advantages. The described techniques may enable a device to avoid unnecessarily receiving paging messages from a scheduling device by supporting the transmission of an indication of a system information update in a number of fields of a message carried by a downlink shared channel, where one or more of the fields may include an indication of a system information update that is relevant for a group of devices that determine to receive the field. Further, some implementations of the described techniques may enable the indication of the system information to provide information relating to the system information parameters that are updated, which may enable a device to more efficiently identify the updated system information parameters and avoid unnecessarily receiving system information parameters that are unchanged. In some examples, the downlink shared channel may carry more information than a downlink control channel, which may be used to provide an indication of a system information update in some alternative examples, and may therefore enable the message to carry a greater amount of information relating to a system information update or other relevant information. Moreover, the techniques described herein are compatible with some alternative methods for indicating a system information update, enabling backwards compatibility and greater system flexibility as described.

Aspects of the disclosure are initially described in the context of wireless communications systems. Aspects of the disclosure are additionally described in the context of a process flow. Aspects of the disclosure are further illustrated by and described with reference to apparatus diagrams, system diagrams, and flowcharts that relate to indication of system information update via a downlink shared channel.

FIG. 1 illustrates an example of a wireless communications system 100 that supports indication of system information update via a downlink shared channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a first device, such as the base station 105, may establish communication with a second device, such as a UE 115, and may transmit, to the UE 115, a message including an indication of a system information update in a downlink shared channel, such as a PDSCH. The UE 115 may receive the message and determine the system information update that is relevant for the UE 115 based on the indication of the system information update. In some examples, the UE 115 may be assigned with one or more identifiers and may determine the indication of the system information update that is relevant for the UE 115 based on identifying one or more fields in the message including identifiers that correspond to at least one of the identifiers assigned to the UE 115. For example, the UE 115 may determine that a field including an identifier that corresponds to one of the identifiers assigned to the UE 115 includes an indication of updated system information that is relevant to the UE 115. Accordingly, the UE 115 may acquire the indicated system information and update the system information at the UE 115. As such, the UE 115 may communicate with the base station 105 based on the updated system information. Additional details relating to the identification of which fields of the message include a relevant system information update are described herein, including with reference to FIG. 2.

Figure 3:
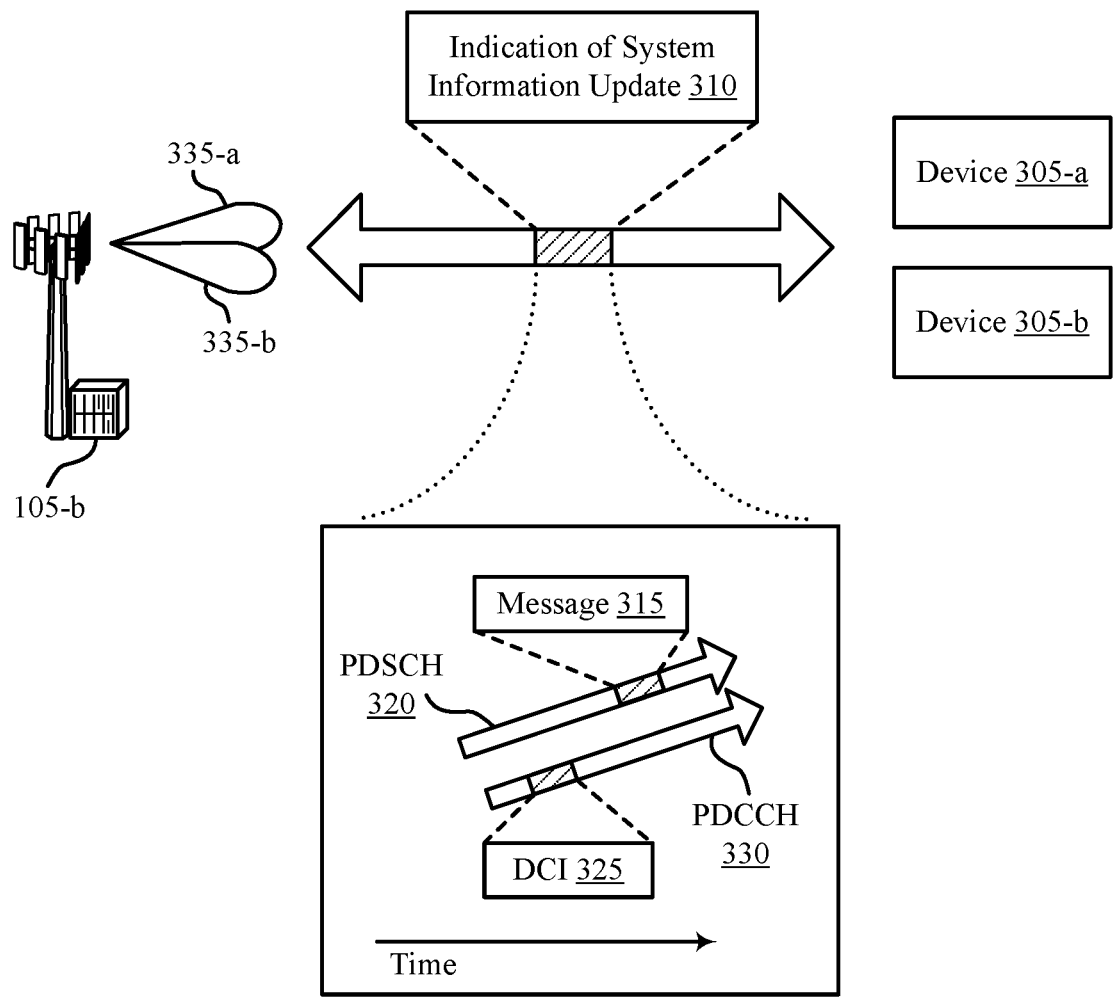
FIG. 3 illustrates an example of a wireless communications system that supports indication of system information update via a downlink shared channel in accordance with aspects of the present disclosure.

The indication of the system information included in the message (e.g., included in each field of the message), may include a variety of indications or parameters associated with a system information update for the UE 115 that may assist the UE 115 in acquiring the updated system information, as described in more detail herein, including with reference to FIG. 3. In some examples, the base station 105 may additionally transmit DCI in a downlink control channel to the UE 115. In some aspects, the DCI may include a second indication of the system information update (which may be transmitted before the other indication) and the UE 115 may use the second indication of the system information update in the DCI in conjunction with the information that the message in the downlink shared channel may provide to determine the system information update for the UE 115. In some examples, the DCI may be a format 1_0 DCI.

In some examples, the base station 105, based on transmitting an indication of a system information update in a downlink shared channel or the DCI, or both, may provide the UE 115 with more information relating to the system information update for the UE 115 than the base station 105 may be able to provide the UE 115 in the DCI. Further, the base station 105 may be able to more appropriately transmit an indication of a system information update that is associated with parameters that are relevant to the operation of the UE 115 and, likewise, may avoid transmitting indications of system information updates to the UE 115 that are associated with parameters that are irrelevant to the UE 115. Although described herein in some sections in the context of a base station 105 and a UE 115, similar techniques may be performed by other devices without exceeding the scope of the present disclosure. For example, the base station 105 may be an example of a parent IAB node and the base station 105 or the parent IAB node may transmit the message including the indication of the system information update to a child IAB node, such as an IAB-MT, in addition to or alternatively to transmitting the message to the UE 115, among other examples.

Figure 2:
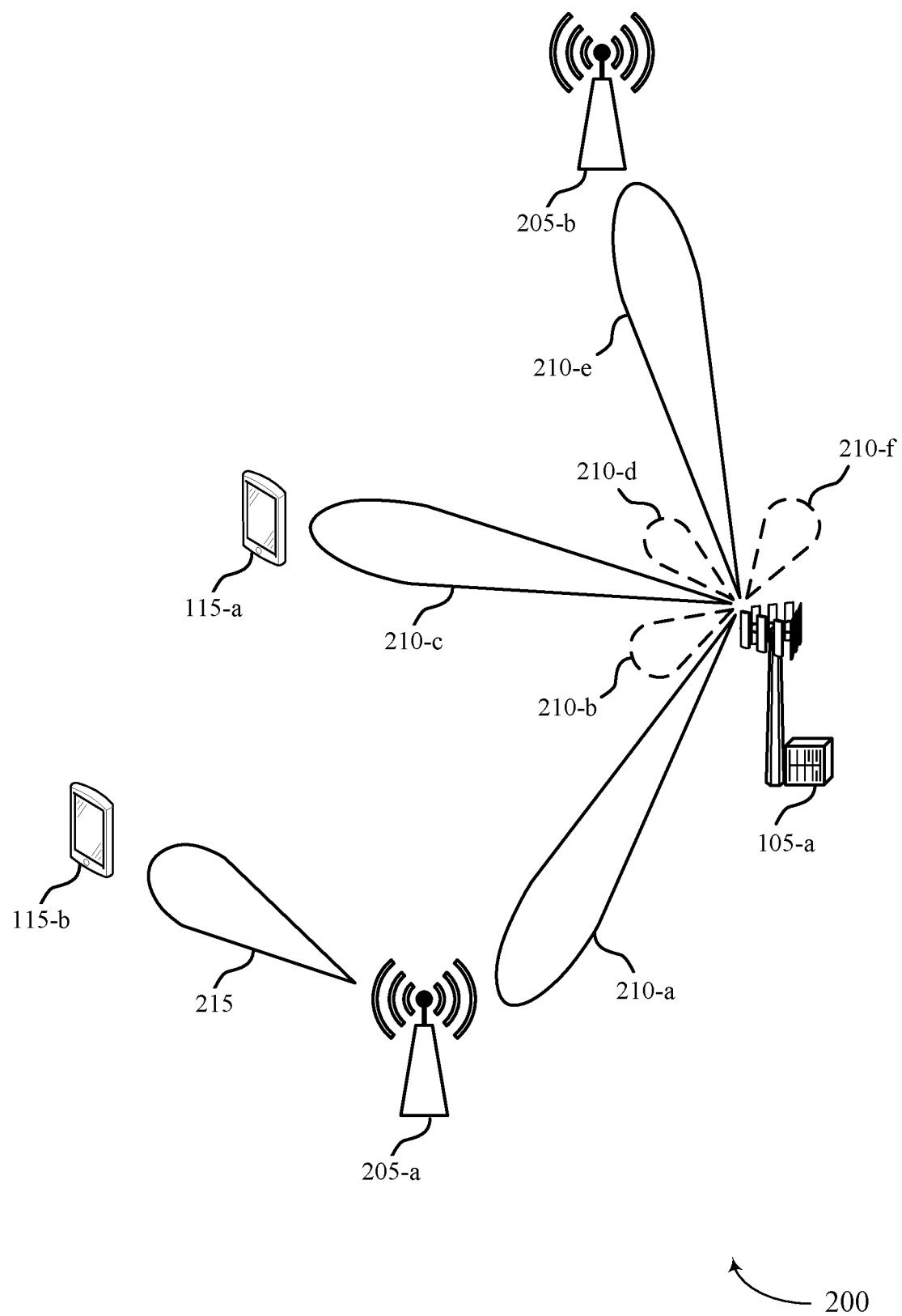
FIG. 2 illustrates an example of a wireless communications system that supports indication of system information update via a downlink shared channel in accordance with aspects of the present disclosure.

FIG. 2 illustrates an example of a wireless communications system 200 that supports indication of system information update via a downlink shared channel in accordance with aspects of the present disclosure. In some examples, the wireless communications system 200 may implement aspects of wireless communications system 100. The wireless communications system 200 may include a UE 115-a, a UE 115-b, an IAB node 205-a, an IAB node 205-b, and a base station 105-a, which may be examples of corresponding devices as described herein. As described herein, the base station 105-a may be an example of any scheduling device and, as such, may equivalently function as a parent IAB node, a donor IAB node, a central unit, another device, or any combination thereof. The IAB node 205-a or the IAB node 205-b may, in some examples, function as a child IAB node, such as an IAB mobile termination (IAB-MT). In some examples, the UE 115-a, the IAB node 205-a, and the IAB node 205-b may establish a connection with the base station 105-a and receive paging messages from the base station 105-a associated with a system information update. In some examples of the present disclosure, the base station 105-a may transmit paging messages in a downlink shared channel, such as a PDSCH.

The UE 115-a and the UE 115-b may be examples of UEs 115 within the wireless communications system 200. Similarly, the IAB node 205-a and the IAB node 205-b may be examples of a number of IAB nodes 205 within the wireless communications system 200. In some aspects, each IAB node 205 may function as a distributed unit and may serve (e.g., control and schedule communications for) a number of child nodes. For example, IAB node 205-a may function as a distributed unit for UE 115-b. Additionally, each IAB node 205 may function as a mobile termination (MT) and may communicate with a parent IAB node, such as the base station 105-a, in a similar manner to a UE 115. Such IAB-MTs may be equivalently referred to as slave nodes.

The UE 115-a may communicate with the base station 105-a via an access link and the IAB node 205-a and the IAB node 205-b may communicate with the base station 105-a via one or more wireless backhaul links. In some examples, the connection between the base station 105-a and the IAB node 205-a and the IAB node 205-b via a wireless backhaul link may enable the deployment of high-density networks at a lower cost by avoiding construction of a wired backhaul link (e.g., a fiber-based ethernet connection) between the base station 105-a and each of the IAB node 205-a and the IAB node 205-b. Such wireless backhaul links may further provide greater signaling efficiency and speed between IAB nodes 205 or base stations 105, or both. In such high-density networks, the operation of IAB nodes 205 and base stations 105 may be highly inter-dependent.

For example, the base station 105-a may allocate each IAB node 205 in the wireless communications system 200 with a resource allocation for wireless communications such that the resource allocation for an IAB node 205 may be non-overlapping with a resource allocation for a different IAB node 205. For example, the base station 105-a may allocate resources to the IAB node 205-a and may allocate different resources to the IAB node 205-b. For instance, the IAB node 205-a may use a first set of resources for communication with the base station 105-a and a second set of resources for communication with the UE 115-b (and may transmit to the UE 115-b via a beam 215), while the IAB node 205-b may use a third set of resources for communication with the base station 105-a. In some examples, based on the level of inter-connectivity and inter-dependence between the IAB nodes 205, among other factors, a resource allocation change for one IAB node 205 may affect the resource allocations for a number of other IAB nodes 205. For instance, the base station 105-a, functioning as a central unit, may re-distribute or re-allocate resources for one or more IAB nodes 205 based on a change in the load or the topology of the IAB-network (e.g., based on a change in network traffic or the location of one or more IAB nodes 205), which may result in a reallocation of resources among a number of other IAB nodes 205 in the system. Accordingly, the base station 105-a may dynamically reallocate resources among the number of other IAB nodes 205. Such reallocation of resource may involve reallocating time resources (e.g., time slots) and frequency resources (e.g., a portion of a frequency band used by the IAB nodes 205), among other aspects, to one or more IAB nodes 205.

In some examples, a reallocation of resources among the IAB nodes 205 may result in a change of one or more configurations or parameters of the IAB nodes 205. For example, a random access procedure configuration of an IAB node 205 may be based on the resource allocation for the IAB node 205 and, if the resource allocation for the IAB node 205 changes, the random access procedure configuration may likewise change. For example, the wireless communication system 200 may support an IAB-specific random access procedure. The IAB-specific random access procedure may use separate random access channel (RACH) occasions, procedures, configurations, or parameters than a random access procedure used by the UEs 115. In some examples, an IAB node 205 may use the IAB-specific random access procedure over a backhaul link for initial access of the IAB node 205. In such cases, the IAB node 205 may use an IAB-specific backhaul RACH configuration to obtain initial access to a parent IAB node, such as the base station 105-a. In some examples, the IAB-specific RACH configuration may be associated with a number of parameters that are dependent on the resource allocation of the IAB node 205. Such parameters may include an offset parameter, a preamble index parameter, a power adjustment parameter, and the like.

For example, the IAB node 205 may expect to use a subset of resources of the resources allocated to the IAB node 205 for the random access procedure (e.g., the IAB-specific RACH configuration) and, if the resource allocation of the IAB node 205 changes, the parameters that the IAB node 205 may use for the random access procedure may likewise change. In some examples, a number of parameters associated with the IAB-specific RACH configuration may be cell-specific, system-wide configurations that the base station 105-a may provide to the IAB node 205 via system information (e.g., via SIB1 or another SIB, such as an IAB-specific SIB). As such, the base station 105-a may transmit an indication of a system information update to the IAB node 205 to indicate that updated system information is available for the IAB node 205. In some examples, the base station 105-a may transmit the indication of the system information update to the IAB node 205 in a paging message.

Paging messages, however, may be broadcast to a number of devices (e.g., all devices) within the geographic coverage area of the base station 105-a in addition to the IAB node 205. In some aspects, the base station 105-a may broadcast the paging message to the UE 115-a, the IAB node 205-a, and the IAB node 205-b using one or more directional beams 210. For example, the UE 115-a, the IAB node 205-a, and the IAB node 205-b may be located at various locations within a geographic coverage area of the base station 105-a and, in some examples, the base station 105-a may transmit the paging message to the UE 115-a, the IAB node 205-a, and the IAB node 205-b using the number of directional beams 210. For example, in some examples, the base station 105-a may transmit the paging message based on implementing a beam-sweeping procedure and may transmit the paging message using a beam 210-a, a beam 210-b, a beam 210-c, a beam 210-d, a beam 210-e, and a beam 210-f. As illustrated in FIG. 2, the base station may use the beam 210-a to transmit the paging message to the IAB node 205-a, the beam 210-c to transmit the paging message to the UE 115-a, and the beam 210-e to transmit the paging message to the IAB node 205-b.

As such, the base station 105-a may transmit the paging message to the UE 115-a based on determining that some parameters associated with the IAB-specific RACH configuration have changed and the UE 115-a, to which the updated parameters associated with the IAB-specific random access procedure may be irrelevant, may nonetheless receive the paging message. For example, the UE 115-a may be associated with different system constraints or service requests and, as such, may primarily use different parameters than the updated parameters associated with the IAB-specific RACH configuration. Further, some IAB-specific RACH configuration parameters may change frequently (e.g., in response to frequent changes in the load or the topology of the IAB-network), which may result in the UE 115-a frequently receiving paging messages relating to updated parameters that are irrelevant to the UE 115-a.

The UE 115-a, the IAB node 205-a, and the IAB node 205-b may receive the paging message in a paging occasion. In some examples, the UE 115-a, the IAB node 205-a, or the IAB node 205-b may be in an idle mode (e.g., an RRC IDLE) or an inactive mode (e.g., an RRC INACTIVE) and may monitor for a paging message indicating a change in system information in a configured paging occasion every discontinuous reception (DRX) cycle. In some other cases, the UE 115-a, the IAB node 205-a, or the IAB node 205-b may be in a connected mode (e.g., an RRC CONNECTED) and may monitor for a paging message indicating a change in system information in any paging occasion at least once per modification period if the UE 115-a, the IAB node 205-a, or the IAB node 205-b is provided with a search space (e.g., a common search space) on an active bandwidth part to monitor for paging.

In such cases, the UE 115-a, the IAB node 205-a, or the IAB node 205-b may blindly detect the paging message in the search space. In either case, the UE 115-a, the IAB node 205-a, or the IAB node 205-b may sometimes receive paging messages associated with updated system information parameters that are irrelevant to the device. For example, although described in the context of updated parameters associated with an IAB-specific RACH configuration, other IAB-specific parameters may change and may cause the base station 105-a to broadcast a paging message to all of the devices served by the base station 105-a. Alternatively, similar situations may arise when UE-specific parameters are updated, which may be irrelevant to the IAB nodes 205, and the base station 105-a determines to broadcast a paging message to all of the devices served by the base station 105-a with an indication relating to the updated UE-specific parameters.

In either situation, the UE 115-a, the IAB node 205-a, or the IAB node 205-b, based on receiving the paging message, may attempt to decode the paging message. In some aspects, the paging message may be associated with an identifier, such as a paging radio network temporary identifier (P-RNTI). Each of the UE 115-a, the IAB node 205-a, or the IAB node 205-b may attempt to decode the paging message based on one or more identifiers (e.g., P-RNTIs) assigned to the UE 115-a, the IAB node 205-a, or the IAB node 205-b. In some examples, the UE 115-a, the IAB node 205-a, or the IAB node 205-b may successfully decode the paging message and, therefore, monitor for and acquire the updated system information from the base station 105-a.

In some examples, the base station 105-a may periodically transmit the system information during a scheduled time period, such as a modification period. As described herein, however, the updated system information may include updated parameters that are irrelevant to some devices. As such, in cases where the updated system information is irrelevant to the UE 115-a, the IAB node 205-a, or the IAB node 205-b, the UE 115-a, the IAB node 205-a, or the IAB node 205-b may expend battery and processing power to receive the system information, even though the relevant parameters in the system information for the device may be the same as those currently stored by the device. As such, it may be desirable for the base station 105-a to configure the transmission of paging messages to the UE 115-a, the IAB node 205-a, and the IAB node 205-b such that devices are paged based on the presence of one or more updated parameters in the system information that are relevant to the device.

In some implementations of the present disclosure, the base station 105-a may transmit a paging message to the UE 115-a, the IAB node 205-a, and the IAB node 205-b in a downlink shared channel, such as a PDSCH. The paging message may include a number of fields and one or more of the fields (e.g., each field) may be associated with an identifier (e.g., each field may include an identifier in a header of the field). In some aspects, the field may be a pagingRecord field. In some examples, the identifier associated with one or more of the fields may correspond to a group of devices or multiple groups of devices that primarily use the system information parameters for which the field may include an update indication field. In some aspects, a group of devices may be defined by a device constraint or a type of service request. In some examples, the constraint or type of service request of a device may depend on a number of other characteristics of the device, such as a class, a category, a mobility, a capability, or any combination thereof.

For example, a group of devices may be defined based on a class, a category, a mobility, a capability, or any combination thereof. For instance, the UE 115-a and the UE 115-b may be a first type of device (e.g., UEs 115) and the IAB node 205-a and the IAB node 205-b may be a second type of device (e.g., IAB nodes 205). As such, in some implementations, the UE 115-a and the UE 115-b may be in a first group (e.g., a default group) that is associated with a first identifier and the IAB node 205-a and the IAB node 205-b may be in a second group that is associated with a second identifier. Additionally or alternatively, the groups may be defined based on a mobility of the device. For example, the IAB node 205-a may be a stationary IAB node 205 and the IAB node 205-b may be a mobile IAB node 205 and, as such, the IAB node 205-a and the IAB node 205-b may be assigned different identifiers that are based on their different mobilities.

In some examples, the groups may be defined based on a level of mobility. For example, the IAB node 205-a and the IAB node 205-b may both be mobile IAB nodes 205, but the IAB node 205-a may be associated with a different level of mobility than the IAB node 205-b. For instance, the IAB node 205-a may be a low-mobility IAB node 205 and the IAB node 205-b may be a high-mobility IAB node 205 and, as such, the IAB node 205-a may be assigned a different identifier than the IAB node 205-b based on their different levels of mobility.

In some additional or alternative examples, the groups may be defined by a class (e.g., a class of an IAB node 205). For example, the IAB node 205-a may be wide-area IAB node 205 and the IAB node 205-b may be a local-area IAB node 205 and, as such, the IAB node 205-a may be assigned a different identifier than the IAB node 205-b based on their different classes. Although described here in the context of the IAB node 205-a and the IAB node 205-b, similar determinations of distinguishing identifiers based on a class, a category, a mobility, a capability, or any combination thereof may be made amongst a number of UEs 115 or any other devices that may communicate within the wireless communications system 200.

In some examples, each of the UE 115-a, the IAB node 205-a, and the IAB node 205-b may be assigned a number (e.g., one or more) of identifiers (e.g., each device may belong to a number of different groups). For example, the IAB node 205-b may be assigned one identifier based on being an IAB node 205 and another identifier based on being a mobile IAB node 205. As such, the UE 115-a, the IAB node 205-a, and the IAB node 205-b may each be assigned a number of identifiers based on the class, the category, the mobility, or the capability, or any combination thereof, of the UE 115-a, the IAB node 205-a, and the IAB node 205-b, respectively. In some aspects, the identifier may provide a common identity of a group of devices that the base station 105-a may use to page the groups separately. As such, the base station 105-a may assign identifiers to the devices within the cell of the base station 105-a to enable greater flexibility to separately page different groups of users (e.g., devices).

Each device may receive the paging message in the downlink shared channel and determine if any of the fields in the paging message include an identifier corresponding to at least one of the number of identifiers assigned to the device. If the device determines that a field includes an identifier corresponding to at least one identifier assigned to the device, the device may determine that the indication of the system information update in the field is associated with a system information update that is relevant for the device. In some examples, the device (e.g., the UE 115-a, the IAB node 205-a, or the IAB node 205-b) may determine that the indication of the system information update in the field of the paging message includes an indication of whether or not updated system information is available for the device. Additionally or alternatively, the indication of the system information update in the field of the paging message may include an indication of a number of SIBs that include updated parameters or an indication of a number of IEs that include updated parameters, or both. Additionally or alternatively, the field in the paging message may include the updated parameters (e.g., in a payload of the PDSCH). Additional details of the indication of the system information update in the fields of the paging message are described herein, including with reference to FIG. 3.

In some examples, the paging message in the downlink shared channel may be a standalone paging message. For example, the UE 115-a, the IAB node 205-a, or the IAB node 205-b may receive the paging message in the downlink shared channel and may determine the indication of the system information update without any other signaling. Alternatively, the UE 115-a, the IAB node 205-a, or the IAB node 205-b may receive the paging message in the downlink shared channel and may receive another (e.g., a second) indication of the system information update. For example, the base station 105-a may transmit a second indication of the system information update in a DCI of a downlink control channel. The second indication of the system information update in the DCI may indicate that a system information update is available for at least one of the UE 115-a, the IAB node 205-a, or the IAB node 205-b. Additionally, in some examples, the UE 115-a, the IAB node 205-a, or the IAB node 205-b may receive the indication of the system information update in the DCI and may determine, based on the indication in the DCI, that the UE 115-a, the IAB node 205-a, or the IAB node 205-b may receive additional information relating to the system information update in the paging message sent in the downlink shared channel. Additional details of the indication of the system information update in the DCI are described herein, including with reference to FIG. 3.

FIG. 3 illustrates an example of a wireless communications system 300 that supports indication of system information update via a downlink shared channel in accordance with aspects of the present disclosure. In some examples, the wireless communications system 300 may implement aspects of wireless communications system 100 and wireless communications system 200. The wireless communications system 300 may include a base station 105-b, a device 305-a, and a device 305-b. As described herein, the base station 105-b may be an example of any scheduling device and, as such, may equivalently function as a parent IAB node, a donor IAB node, a central unit, or the like. In some aspects, the base station 105-b may be referred to as a second device. The device 305-a and the device 305-b may, in some examples, function as UEs 115 or IAB nodes, such as a child IAB node or an IAB-MT, as described herein, including with reference to FIG. 2. In some aspects, a device 305 may be referred to as a first device.

The base station 105-b may transmit an indication of a system information update 310 to the devices 305 using a number of directional beams 335, such as a beam 335-a and a beam 335-b. In some examples, the base station 105-b may transmit the indication of the system information update 310 via a message 315 (e.g., a paging message) in a downlink shared channel, such as a PDSCH 320, using the beam 335-a and the beam 335-b. Accordingly, the device 305-a and the device 305-b may receive the indication of the system information update 310 from the base station 105-b via either the beam 335-a or the beam 335-b.

In some examples, the base station 105-b may transmit one or more transmissions related to providing a system information update, details associated with a system information update, or both. For example, the base station 105-b may transmit DCI, such as a part of a PDCCH transmission (for example, DCI 325 which may be a part of PDCCH 330), that may schedule a transmission of message 315, such as part of a PDSCH transmission (for example, message 315 which may be a part of PDSCH 320). In some examples, the PDCCH 330 that may include DCI 325 may be an example of a paging PDCCH and may be referred to as a paging PDCCH herein. The PDCCH 330 may be transmitted before and schedule a later PDSCH, such as PDSCH 320. In some examples, the PDSCH 320 (that may be used to transmit the message 315) may be an example of a paging PDSCH and may be referred to as a paging PDSCH herein. In some examples, as described herein, one or both of the DCI 325 or the message 315 may include an indication of a system information update, or details associated with a system information update, or both, among other information.

As described herein, the device 305-a may be included in a first group of devices 305 and the device 305-b may be included in a second group of devices 305. As such, the device 305-a and the device 305-b may be associated with different identifiers and, likewise, relevant indications of a system information update 310 for the device 305-a and the device 305-b may be included in different fields of the message 315, as described in more detail herein, including with reference to FIG. 2. Further, based on being in different groups, the device 305-a and the device 305-b may be associated with different constraints, different service requests, different types, classes, or categories of devices 305, different mobilities, or different capabilities, or any combination thereof, as also described in more detail herein, including with reference to FIG. 2. In some embodiments, the device 305-a may be an IAB-node and the device 305-b may be a UE 115.

The message 315 (e.g., each field of the message 315) may provide an indication of a system information update 310. The indication of the system information update 310 may convey a variety of indications or parameters that are associated with updated system information for a group of devices 305. In some examples, a device 305 may receive the indication of the system information update 310 and may use the information conveyed by the indication of the system information update 310 to assist the device 305 in determining which system information parameters (e.g., which system information parameters that are relevant to the device 305) have been updated.

In some implementations, a device 305 may receive the indication of the system information update 310 in the message 315 (e.g., in a field of the message 315 associated with the device 305) and may determine that the message 315 includes an indication of whether or not updated system information for the device 305 is available. In some examples, the indication may be a flag of one or more bits. The device 305, based on receiving the flag and determining the flag is set (e.g., equal to a value of 1), may monitor for and acquire the system information transmitted by the base station 105-b. For example, the device may receive a number of SIBs (e.g., all SIBs) that are transmitted from the base station 105-b, and the device 305 may update the parameters stored at the device 305 with the parameters included in the number of SIBs. Alternatively, the flag in the message 315 may be a value of 0, and the device 305 may determine that updated system information for the device 305 is unavailable (e.g., the device 305 currently stores up-to-date system information). In such cases, the device 305 may refrain from acquiring the system information.

Additionally or alternatively, the device 305 may receive the indication of the system information update 310 in the message 315 (e.g., in a field of the message 315 associated with the device 305) and may determine that the message 315 includes an indication of a number of SIBs that include updated parameters. For example, the base station 105-b may determine that a subset of the total number of SIBs include updated parameters and may indicate, via the message 315, which SIBs include the updated parameters. As such, the device 305 may monitor for and acquire the indicated SIBs and may refrain from acquiring SIBs that are absent of an indication in the message 315. In other words, the device may expect the indicated SIBs to include updated parameters and the device 305 may expect the SIBs that are absent of an indication to include parameters that are unchanged relative to the parameters currently stored at the device 305.

In some examples, the message 315 may include a number of bits that correspond to the number of SIBs, and the device 305 may determine which SIBs include updated parameters based on a mapping (e.g., an RRC configured mapping or a pre-configured mapping) between the number of bits in the message 315 and the number of SIBs. As such, in some examples, the device 305 may identify, based on the mapping, that a first bit that indicates whether or not the indication of the system information update 310 is relevant for the device 305 and that a second number of bits indicates which SIBs include updated parameters. In some examples, the device 305 may receive signaling of the mapping between the indices of the PDSCH to the number of IEs from the base station 105-b. The device 305, based on determining which SIBs include updated system information that is relevant to the device 305, may improve the efficiency of receiving a system information update, as the device may selectively acquire system information at a greater granularity than a device that receives all SIBs regardless of which IEs of the SIBs include the updated parameters.

Additionally or alternatively, the device 305 may receive the indication of the system information update 310 in the message 315 (e.g., in a field of the message 315 associated with the device 305) and may determine that the message 315 includes an indication of a number of IEs that include updated parameters. For example, each SIB transmitted by the base station 105-b may be associated with a number of IEs that include one or more updated parameters. The device 305, based on determining which IEs include updated parameters, may monitor the determined IEs and acquire the updated parameters transmitted by the base station 105-a in the determined IEs. Accordingly, the device 305 may avoid receiving an entire SIB when a subset of IEs of the SIB include updated parameters. In some examples, determining a number of IEs including updated parameters may enhance the efficiency of receiving a system information update, as the device 305 may selectively acquire system information at a greater granularity than a device that receives all SIBs regardless of which IEs of the SIBs include the updated parameters.

In some aspects, the indication of the IEs including updated parameters may correspond to IEs within a single SIB. In some other aspects, the indication of the IEs including updated parameters may correspond to IEs across a number of different SIBs (e.g., two or more different SIBs). For example, the base station 105-b may transmit some IEs, such as those conveying parameters that are applicable to cells in the same frequency or in a different frequency, or in a cell using a different radio access technology (RAT). Such intra-frequency, inter-frequency, or inter-RAT parameters may be conveyed across a number of different SIBs. Such parameters may include a cell selection parameter, a cell-reselection parameter, or a cell measurement parameter of a neighboring cell based on the frequency of the neighboring cell.

In some examples, the message 315 may include a number (e.g., one or more) of bits and the device 305 may determine which IEs include updated parameters based on the number of bits in the message 315 and a mapping. For example, the device 305 may be configured (e.g., RRC configured or pre-configured) with a mapping and may apply the mapping to the bits in the message 315 to determine which IEs include updated parameters. For instance, the device 305 may determine a mapping between the indices of the PDSCH carrying the message 315 and the number of IEs in the system information. As such, in an example, the device 305 may identify, based on the mapping, that a first bit that indicates whether or not the indication of the system information update 310 is relevant for the device 305 and that a second number of bits indicates which IEs include updated parameters. In some examples, the device 305 may receive signaling of the mapping between the indices of the PDSCH to the number of IEs from the base station 105-b.

Additionally or alternatively, the device 305 may receive the indication of the system information update 310 in the message 315 (e.g., in a field of the message 315 associated with the device 305) and may determine that a payload of the PDSCH 320 includes one or more updated parameters. For example, the PDSCH 320 may include values for a number of system information parameters and the device 305 may update the system information for the device 305 based on the values of the parameters in the PDSCH 320. In some examples, the PDSCH 320 may include values for one or more of, or all of, the system information parameters that the base station 105-b may otherwise transmit to the device 305 via a number of SIBs. In such examples, the device 305 may detect the presence of the system information in the PDSCH 320 and may acquire the system information accordingly.

In some examples, the payload of the PDSCH 320 may include a subset of the system information parameters and the message 315 may include an indication of which system information parameters are included in the payload of the PDSCH 320. In other words, the PDSCH 320 may include a subset of the parameters that may otherwise be provided by the base station 105-b via a number of SIBs. In such examples, a first portion (e.g., a first header) of the message 315 may indicate the type of parameters (e.g., IAB-specific RACH configuration parameters) and which parameters of the type of parameters are included in the payload of the PDSCH 320, and a second portion (e.g., a second header) may include a number of bits indicating a value corresponding to each of the indicated parameters. In some implementations, the PDSCH 320 may include the parameters that are updated (e.g., all updated system information parameters) and may refrain from including the parameters that are unchanged relative to the parameters currently stored at the device 305. Additionally or alternatively, the PDSCH 320 may include updated parameters that are relevant to the device 305 (e.g., which may be a subset of all of the updated system information parameters) and may refrain from including updated parameters that are irrelevant to the device 305.

In some examples of the present disclosure, a device 305 may receive the indication of the system information update 310 in the message 315 in the PDSCH 320 and may determine a system information update for the device 305 without additional signaling from the base station 105-b. For example, the base station 105-b may refrain from transmitting an indication of the system information update 310 in DCI 325 carried by the PDCCH 330. As such, the described techniques may avoid impacting devices employing alternative techniques for providing an indication of a system information update 310.

In some examples, a device 305 may receive an indication (e.g., a second indication) of the system information update 310 in the DCI 325 in the PDCCH 330. In such examples, the device 305 may receive the DCI 325 prior to receiving the message 315, and the DCI 325 may provide an indication to a device 305 that updated system information is available for the device 305. In some cases, the DCI 325 may be an example of a paging PDCCH and may be referred to as a paging PDCCH. Further, in some implementations, the indication of the system information update 310 in the DCI 325 may indicate that the device 305 may receive additional information (e.g., scheduling information) relating to the system information update in the message 315. In other words, the indication of the system information update 310 may be split between the DCI 325 and the message 315, and the device 305 may receive both of the DCI 325 and the message 315 to receive the complete indication of the system information update 310. For example, the DCI 325 may include an indication that one or more parameters in system information have been updated and may schedule the message 315, where the message 315 may include additional information relating to the updated system information, such as which SIBs or IEs include updated parameters, for which devices 305 or group of devices 305 the updated parameters may be relevant, the updated parameters, and the like.

In some implementations, the message 315 in the PDSCH 320 may provide scheduling information associated with the updated parameters in the system information. For example, the message 315 in the PDSCH 320 may carry information of a resource and a configuration that the device 305 may use to scan for a second PDCCH (e.g., a PDCCH associated with scheduling information of one or more SIBs, which may be referred to herein as an SIB PDCCH), as described herein, including with reference to FIG. 4. In some examples, the second PDCCH may be a different PDCCH than the PDCCH 330. In some examples, the second PDCCH may schedule the transmission of one or more SIBs in a second PDSCH (e.g., a PDSCH carrying one or more SIBs, which may be referred to herein as a SIB PDSCH). In some examples, the second PDSCH may be a different PDSCH than the PDSCH 320. Additional details relating to such scheduling information are described in more detail herein, including with reference to FIG. 4.

In some aspects, the DCI 325 may include a short message, which may sometimes be an extended short message, and the short message may indicate that updated system information is available for the device 305 via a flag of one or more bits. In some examples, the flag may be a device-specific flag associated with a type, a class, or a category of a device 305. For example, the device-specific flag may be associated with the first group of devices including the device 305-a. In such examples, the device 305-a may determine that the flag is associated with the device 305-a and the device 305-a may likewise determine to receive system information based on the flag in the DCI 325 and the indication of the system information update 310 in the message 315 (e.g., which SIBs or IEs may include updated parameters).

In addition to assisting associated devices 305, such as the device 305-a, determine that a relevant system information update is available for the associated devices 305, the device-specific flag may further avoid causing non-associated devices 305 from receiving irrelevant system information. For example, the device 305-b associated with the second group of devices 305 may primarily use different system information parameters than the first group of devices. In such examples, the device 305-b may identify the device-specific flag in the DCI 325 and may determine that the indication of the system information update 310 is irrelevant to the device 305-b. Accordingly, the device 305-b may refrain from using the device-specific flag to determine to acquire system information. In some examples, if the device 305-b fails to identify a flag associated with the device 305-b or a group of devices 305 including the device 305-b, the device 305-b may refrain from acquiring system information. In some examples, the device-specific flag may be an IAB-specific flag and may indicate that updated parameters are available for IAB nodes. In such examples, an IAB node may identify the IAB-specific flag and determine to acquire system information while other devices in the system, such as UEs, may refrain from acquiring system information based on the IAB-specific flag. Accordingly, the DCI 325 may include IAB-specific content and UE-specific content. In some examples, the IAB-specific content of the DCI 325 may use one or more reserved bits in the short message.

Additionally or alternatively, the short message (e.g., an extended short message) of the DCI 325 may be associated with a P-RNTI and a device 305 may determine if the indication of the system information update 310 in the DCI 325 is relevant to the device 305 based on the P-RNTI of the short message. For example, the short message of the DCI 325 may be scrambled with the P-RNTI and the device 305 may determine whether or not the device 305 is able to decode the short message by attempting to descramble the short message using one or more P-RNTIs that are assigned to the device 305.

If the device 305 is assigned a P-RNTI matching the P-RNTI of the short message, the device 305 may determine that the indication of the system information update 310 in the short message of the DCI 325 is meant for the device 305 and may acquire system information based on the indication of the system information update 310 in the DCI 325 and the indication of the system information update 310 in the message 315. If the P-RNTI associated with the short message of the DCI 325 is different than the one or more P-RNTIs assigned to the device 305, the device 305 may determine that the content of the short message of the DCI 325 (e.g., the indication of the system information update 310) is meant for different devices than the device 305. As such, the device 305 may avoid wasting power by refraining from acquiring system information that may be absent of updated parameters that are relevant to the device 305.

In some aspects, the P-RNTI may be a device-specific P-RNTI. For example, the device 305-a may be assigned a different P-RNTI than the device 305-b. In examples where the device 305-a is an IAB-node and the device 305-b is a UE, the device-specific P-RNTI assigned to the device 305-a may be referred to as an IAB-specific P-RNTI.

Further, in some examples, different groups of devices 305 may be configured for different paging search spaces or paging occasions (e.g., for devices 305 in an idle or inactive mode). For example, the first group of devices including the device 305-a may monitor for the indication of the system information update 310 during a first paging search space or a first paging occasion and the second group of devices including the device 305-b may monitor for the indication of the system information update 310 during a second paging search space or a second paging occasion. As such, the base station 105-b may transmit an indication of a system information update 310 that is relevant to the first group of devices 305 during the first paging search space or the first paging occasion and may transmit an indication of a system information update 310 that is relevant to the second group of devices 305 during the second paging search space or the second paging occasion.

In some aspects, the different groups of devices 305 may be defined by a type of device 305, such as an IAB node or a UE, and the different groups of the devices 305 may likewise be configured for IAB-specific paging search spaces or IAB-specific paging occasions or non-overlapping UE-specific paging search spaces or UE-specific paging occasions. As described herein, such an indication may include the indication of the system information update 310 in the message 315 in the PDSCH 320 or the indication of the system information update 310 that is split between the message 315 and the DCI 325 in the PDCCH 330. In some examples, the device 305 may blindly detect the indication of the system information update 310 in the DCI 325 during the paging search space. Additionally or alternatively, the device 305, which may be a device 305 in an idle or inactive mode, may periodically wake up from a sleep mode during the paging occasion to detect an indication of the system information update 310.

By including the indication of the system information update 310 at least partially in the message 315 in the PDSCH 320, the base station 105-b may use the DCI 325 (e.g., the short message of the DCI 325) for other signaling, which may enhance the capability of the base station 105-b and improve system efficiency. For example, the short message may include signaling associated with other purposes, such as IoT-specific signaling.

Figure 4:
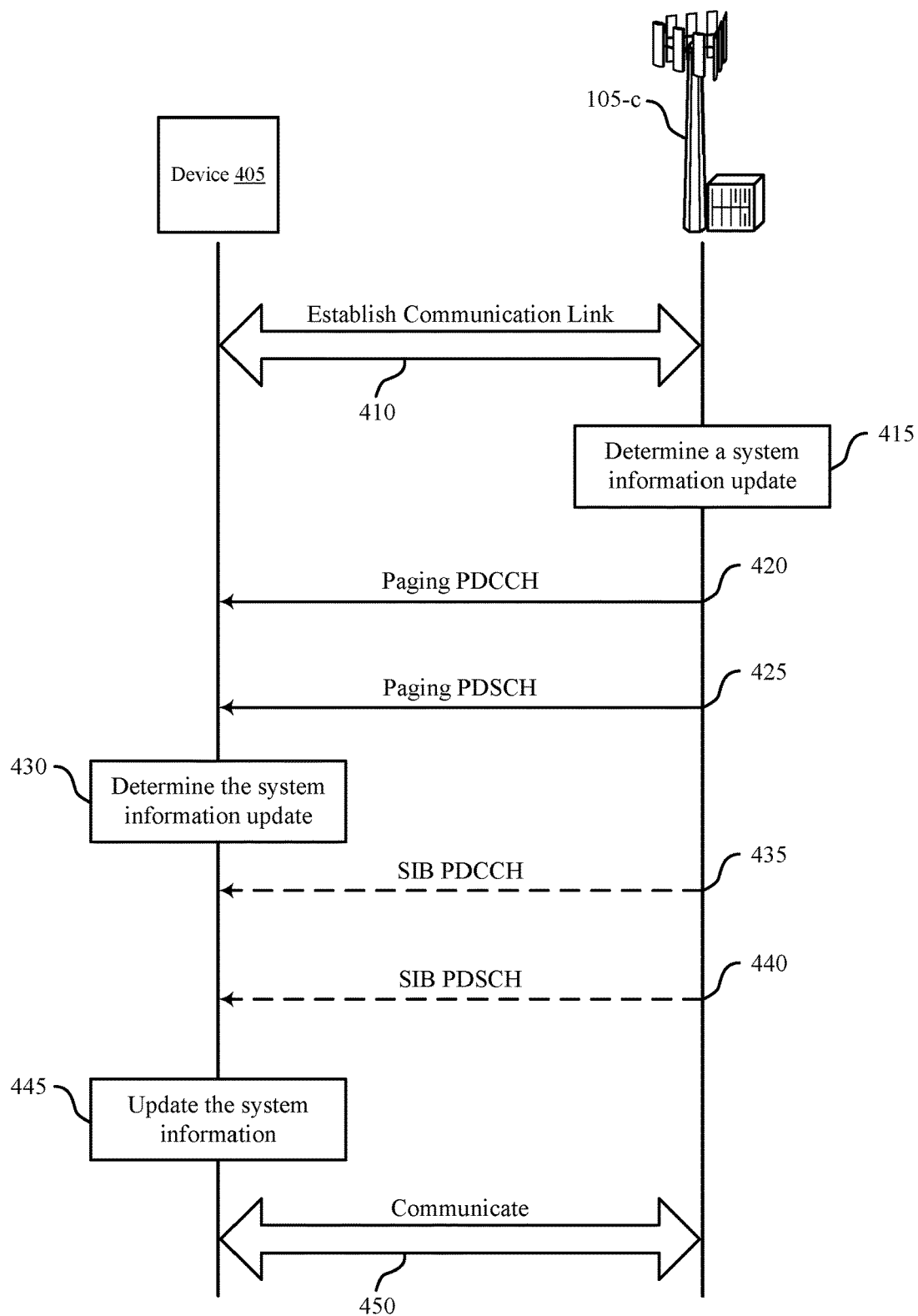
FIG. 4 illustrates an example of a process flow that supports indication of system information update via a downlink shared channel in accordance with aspects of the present disclosure.

FIG. 4 illustrates an example of a process flow 400 that supports indication of system information update via a downlink shared channel in accordance with aspects of the present disclosure. In some examples, the process flow 400 may be implemented by aspects of wireless communications system 100, wireless communications system 200, and wireless communications system 300. The process flow 400 may illustrate communication between a device 405 and a base station 105-c, which may be examples of corresponding devices as described herein. As described herein, the base station 105-c may function as a scheduling device and, as such, may equivalently function as a parent IAB node, a donor IAB node, a central unit, or the like. In some aspects, the base station 105-c may be referred to as a second device. The device 405 may, in some examples, function as a UE or an IAB node, such as a child IAB node or an IAB-MT. In some aspects, the device 405 may be referred to as a first device. In some examples, the base station 105-c may provide an indication of a system information update to a group of devices including the device 405 in a paging message carried by a PDSCH.

At 410, the device 405 and the base station 105-c may establish a communication link to support wireless communications between the device 405 and the base station 105-c. In some examples, such as when the device 405 is a UE, the communication link may be an access link. In some examples, such as when the device 405 is a child IAB or an IAB-MT, the communication link may be a backhaul link.

At 415, the base station 105-c may determine a system information update for the device 405 (or for a group of devices including the device 405) based on one or more conditions. The system information update may include an update to one or more system information parameters that are relevant to the device 405, among other devices. For example, in the case that the device 405 is a UE, the base station 105-c may determine that one or more UE-specific system information parameters have changed. Additionally or alternatively, in the case that the device 405 is a child IAB node, the base station 105-c may determine that one or more IAB-specific system information parameters have changed.

At 420, the base station 105-c may transmit a paging PDCCH to the device 405. As described herein, the base station 105-c may transmit the paging PDCCH as a DCI in a downlink control channel (e.g., the PDCCH) to the device 405. In some examples, the device 405 may receive the DCI by monitoring (e.g., blindly detecting) the downlink control channel. In some examples, the DCI may schedule a message that may be carried by a downlink shared channel (e.g., a PDSCH), such as a paging PDSCH. In some implementations, the DCI may carry a second indication (e.g., in addition to another indication over another channel that may occur for example later) of a system information update for the device 405. In some examples, the base station 105-c may transmit the second indication of the system information update in a short message of the DCI.

At 425, the base station 105-c may transmit a paging PDSCH to the device 405. As described herein, the base station 105-c may transmit the paging PDSCH as the message in the downlink shared channel (e.g., the PDSCH) to the device 405, the message including an indication of the system information update for the device 405. As such, the message may be a paging message carried by the downlink shared channel and may include information relating to the system information update for the device 405 in a field corresponding to the device 405 or to the group of devices including the device 405. The paging PDSCH (e.g., the message) may include an indication of whether or not updated system information that is relevant to the device 405 is available, an indication of a number of SIBs updated (e.g., a number of SIBs including updated parameters), an indication of a number of IEs updated (e.g., a number of IEs including updated parameters), an indication that a payload of the downlink shared channel includes one or more updated parameters, or any combination thereof. Additional details relating to the contents of the paging PDSCH are described herein, including with reference to FIG. 3.

In some implementations, the paging PDSCH may include scheduling information relating to a SIB (e.g., a SIB PDSCH) that may be later transmitted by the base station 105-c. For example, the paging PDSCH may include an indication of a location and a configuration, among other information, that the device 405 may use to receive control signaling relating to the SIB, such a SIB PDCCH (e.g., a SIB-specific PDCCH).

At 430, the device 405 may determine the system information update for the device 405 based on receiving the paging PDCCH (e.g., the DCI) and the paging PDSCH (e.g., the indication of the system information update in the message). In some examples, the device 405 may use the paging PDSCH to determine the presence of relevant updated system information and to determine a location for receiving the relevant updated system information, if available. Additionally or alternatively, the device 405 may identify which SIBs include the relevant updated system information or which IEs include the relevant updated system information. Additionally or alternatively, the device 405 may receive the relevant updated system information in the paging PDSCH (e.g., in the payload of the downlink shared channel). In some implementations, the device 405 may use the indication and the second indication of the system information update in the paging PDCCH (e.g., the DCI) and the paging PDSCH (e.g., the message), respectively, to determine the system information update for the device 405, as described in more detail herein, including with reference to FIG. 3.

At 435, the base station 105-c may, in some examples, transmit the SIB PDCCH including scheduling information relating to a SIB PDSCH including one or more SIBs. In some examples, the device 405 may scan for the SIB PDCCH based on receiving an earlier SIB (e.g., a SIB1) including scheduling information relating to the SIB PDCCH. In some examples, additionally or alternatively, the device 405 may receive the SIB PDCCH based on scheduling and configuration information included in the paging PDSCH transmitted at 425. In some aspects, such as when the paging PDSCH includes the updated parameters, the device 405 may refrain from receiving the SIB PDCCH.

At 440, the base station 105-c may, in some examples, transmit the SIB PDSCH to the device 405 including one or more SIBs. In some examples, the device 405 may receive the SIB PDSCH based on the scheduling information included in the SIB PDCCH received at 435. In some aspects, such as when the paging PDSCH includes the updated parameters, the device 405 may refrain from receiving the SIB PDSCH.

At 445, the device 405 may update the system information for the device 405 based on determining the system information update and based on receiving the SIB PDSCH. In some examples, updating the system information for the device 405 may include acquiring the system information via the one or more SIBs transmitted by the base station 105-c at 440 or acquiring the system information included in the payload of the downlink shared channel. The device 405, based on implementing the techniques described herein, may more efficiently update the system information for the device 405 based on the information provided by the base station 105-c in the paging PDSCH (e.g., the message carried by the downlink shared channel). For example, the device 405 may selectively monitor for and a number of SIBs or a number of IEs in one or more SIB PDSCHs for updated system information that is relevant to the device 405 and, as such, may avoid unnecessarily acquiring all system information parameters when a subset of the parameters have changed while also refraining from acquiring (or being paged for) system information that is irrelevant to the device 405.

At 450, the device 405 may communicate with the base station 105-c based on updating the system information. In other words, the device 405 may update the system information for the device 405 and communicate with the base station 105-c using the updated system information. In some examples, such as when the device 405 is a child IAB node, the device 405 may perform a random access procedure to reconnect to the base station 105-c or to connect to a different base station based up acquiring updated parameters for an IAB-specific random access procedure.

Figure 5:
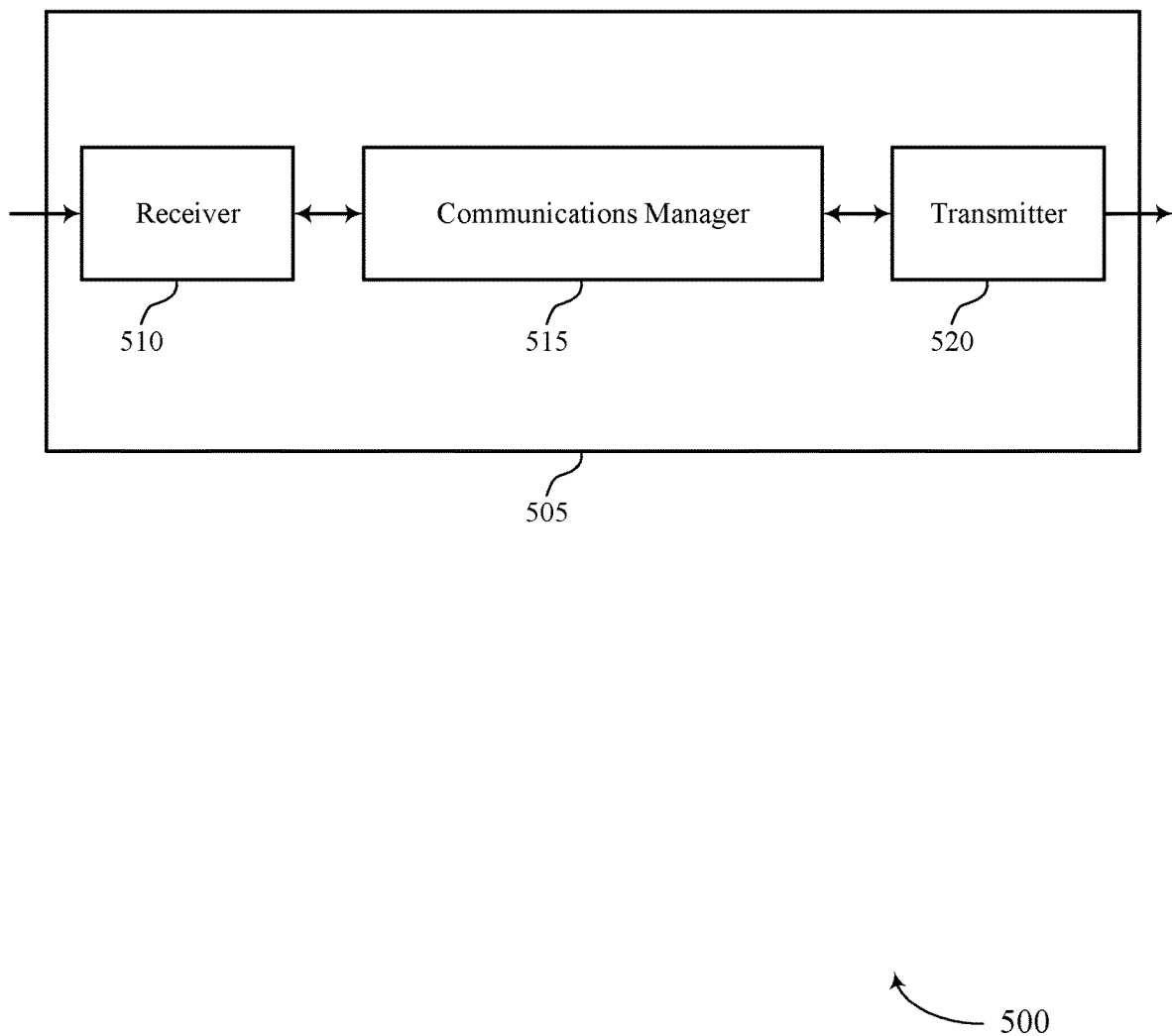
FIGS. 5 and 6 show block diagrams of devices that support indication of system information update via a downlink shared channel in accordance with aspects of the present disclosure.

FIG. 5 shows a block diagram 500 of a device 505 that supports indication of system information update via a downlink shared channel in accordance with aspects of the present disclosure. The device 505 may be an example of aspects of a UE 115, an IAB node 205, or a device 305 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to indication of system information update via a downlink shared channel, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a communication link with a second device, communicate with the second device based on updating the system information, receive, from the second device based on establishing the communication link, DCI in a downlink control channel and a message in a downlink shared channel, the message including an indication of a system information update for the first device, determine the system information update for the first device based on receiving the DCI and the indication of the system information update in the message, and update the system information for the first device based on determining the system information update. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. In some implementations of the present disclosure, the communications manager 515 may more efficiently acquire system information that is relevant to the device 505 and refrain from acquiring system information that is irrelevant to the device 505. Further, based on receiving a paging message in a PDSCH, the communications manager 515 may avoid storing a configured RNTI and may avoid storing IAB-specific resources, such as IAB-specific search spaces or paging occasions (e.g., in the case that the device 505 is an IAB node). As a result, the device 505 may reduce resource overhead and enable greater system throughput, because such IAB-specific resources may be used for other signaling.

Based on implementing the described techniques, one or more processing units of the device 505 associated with receiving paging messages or system information may spend less time monitoring or receiving paging messages or system information that is irrelevant to the device 505 and, as such, may spend longer durations in a sleep mode. In some examples, this may result in improved power savings and longer battery life of the device 505.

Figure 6:
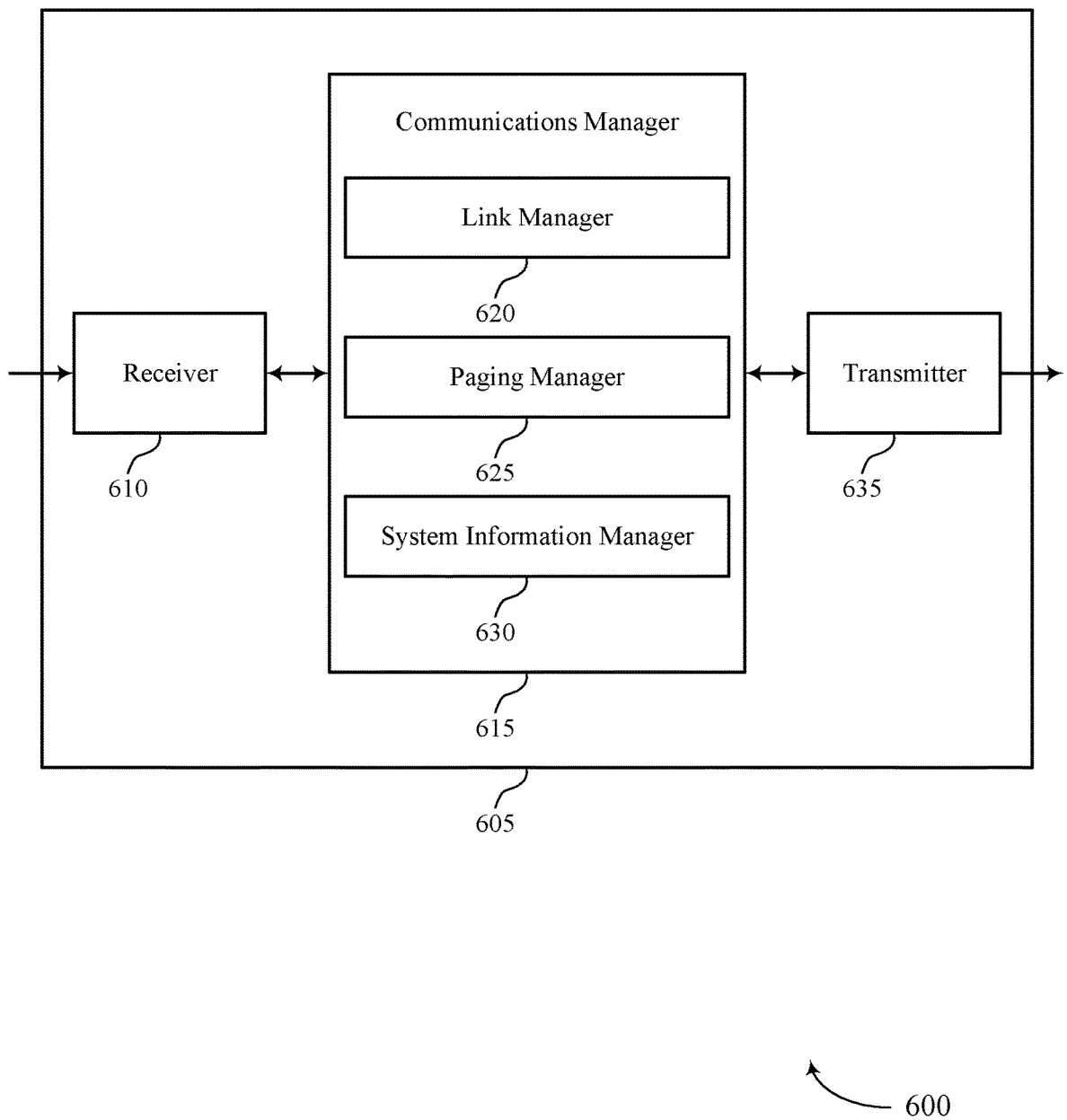

FIG. 6 shows a block diagram 600 of a device 605 that supports indication of system information update via a downlink shared channel in accordance with aspects of the present disclosure. The device 605 may be an example of aspects of a device 505, a UE 115, an IAB node 205, or a device 305 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to indication of system information update via a downlink shared channel, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a link manager 620, a paging manager 625, and a system information manager 630. The communications manager 615 may be an example of aspects of the communications manager 810 described herein.

The link manager 620 may establish a communication link with a second device and communicate with the second device based on updating the system information. The paging manager 625 may receive, from the second device based on establishing the communication link, DCI in a downlink control channel and a message in a downlink shared channel, the message including an indication of a system information update for the first device.

The system information manager 630 may determine the system information update for the first device based on receiving the DCI and the indication of the system information update in the message and update the system information for the first device based on determining the system information update.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
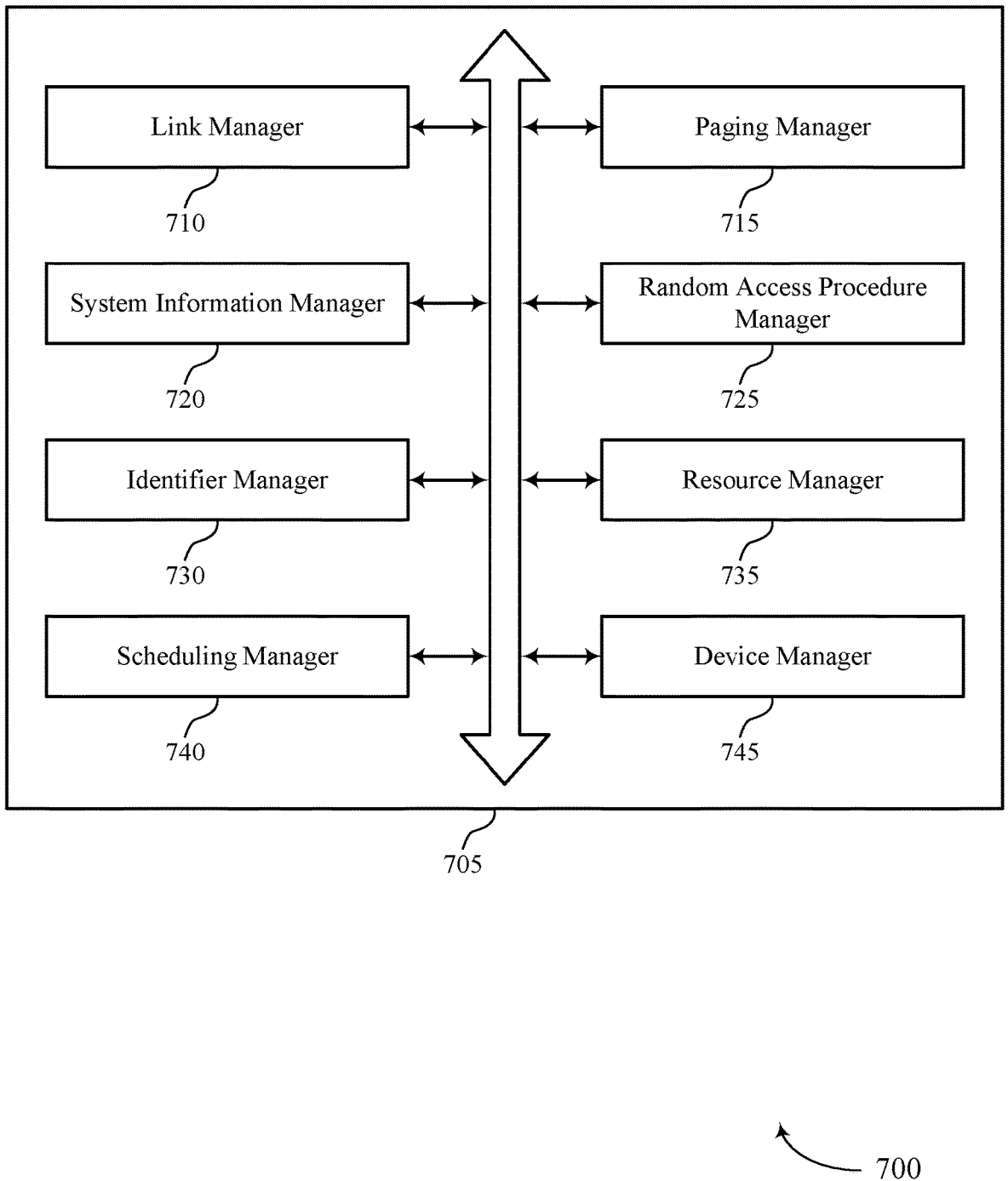
FIG. 7 shows a block diagram of a communications manager that supports indication of system information update via a downlink shared channel in accordance with aspects of the present disclosure.

FIG. 7 shows a block diagram 700 of a communications manager 705 that supports indication of system information update via a downlink shared channel in accordance with aspects of the present disclosure. The communications manager 705 may be an example of aspects of a communications manager 515, a communications manager 615, or a communications manager 810 described herein. The communications manager 705 may include a link manager 710, a paging manager 715, a system information manager 720, a random access procedure manager 725, an identifier manager 730, a resource manager 735, a scheduling manager 740, and a device manager 745. Each of these modules may communicate, directly or indirectly, with one another (e.g., via one or more buses).

The link manager 710 may establish a communication link with a second device. In some examples, the link manager 710 may communicate with the second device based on updating the system information.

The paging manager 715 may receive, from the second device based on establishing the communication link, DCI in a downlink control channel and a message in a downlink shared channel, the message including an indication of a system information update for the first device. In some examples, the paging manager 715 may receive a flag of one or more bits. In some examples, the paging manager 715 may receive an indication of one or more SIBs updated.

In some examples, the paging manager 715 may receive an indication of one or more system IEs updated. In some examples, the paging manager 715 may receive an indication that the one or more system IEs updated are associated with a set of SIBs. In some examples, the paging manager 715 may receive a second indication of the system information update, and where determining the system information update for the first device is based on receiving the second indication of the system information update in the DCI.

In some examples, the paging manager 715 may receive a flag of one or more bits, receiving an indication of one or more SIBs updated, receiving an indication of one or more system IEs updated, or receiving, in a payload on the shared channel, one or more system information parameters updated, or any combination thereof. In some examples, receiving the second indication of the system information update in the DCI includes receiving the indication of the system information update in a short message of the DCI. In some examples, the paging manager 715 may receive the indication of the system information update in a field in the message.

In some examples, the paging manager 715 may receive, in the message, an indication of one or more SIBs updated, an indication of one or more system IEs updated, one or more system information parameters updated, or any combination thereof. In some examples, the paging manager 715 may receive, in the DCI, a flag of one or more bits associated with the first device, an indication of a paging identifier associated with the first device, an indication of paging search space associated with the first device, an indication of one or more paging occasions associated with the first device, or any combination thereof.

In some examples, the flag, the indication of the paging identifier, the indication of the paging search space, the indication of the one or more paging occasions, or any combination thereof is included in a short message of the DCI. In some examples, the message is a paging message in the downlink shared channel; and where a field in the message associated with the indication of the system information update is a paging record field.

The system information manager 720 may determine the system information update for the first device based on receiving the DCI and the indication of the system information update in the message. In some examples, the system information manager 720 may update the system information for the first device based on determining the system information update.

In some examples, the system information manager 720 may receive, in a payload on the shared channel, one or more system information parameters updated. In some examples, the one or more system IEs updated are associated with a cell selection parameter, a cell re-selection parameter, a cell measurement parameter, or any combination thereof.

The random access procedure manager 725 may store one or more parameters associated with a RACH configuration and, in some examples, may perform a random access procedure. In some examples, the one or more system information parameters updated include one or more configuration parameters associated with a random access procedure.

The identifier manager 730 may receive an identifier associated with the field in the message, the identifier assigned to one or more devices in a group of devices including being assigned to the first device as one of the one or more devices in the group of devices, the method further including. In some examples, the identifier manager 730 may determine that the identifier associated with the field in the message is assigned to the first device is based on a class of the first device, a category of the first device, a mobility of the first device, a capability of the first device, or any combination thereof.

In some examples, the identifier manager 730 may receive a second identifier associated with the field or the second field in the message, the second identifier assigned to one or more devices in a second group of devices including being assigned to the first device as one of the one or more devices in the second group of devices, the method further including.

The resource manager 735 may store configured resources that may be used for wireless communication. In some examples, the indication of the one or more paging occasions is based on a state of the first device, the state of the first device including an idle state, an inactive state, or a connected state.

The scheduling manager 740 may determine scheduling information associated with wireless communication. In some examples, the indication of the system information update in the downlink shared channel includes scheduling information associated with an updated system information message. In some examples, the DCI schedules the message in the downlink shared channel.

The device manager 745 may determine a class, a category, a type, a mobility, or a capability of the first device. In some examples, the first device is associated with a first type of devices associated with a first type of service different than a second type of devices associated with a second type of service. In some examples, a type of a device is based at least in part a class of the device, a category of the device, a mobility of the device, or a capability of the device, or any combination thereof. In some examples, the first device is a child IAB node or a user equipment and the second device is a parent IAB node, a central unit, or a base station.

Figure 8:
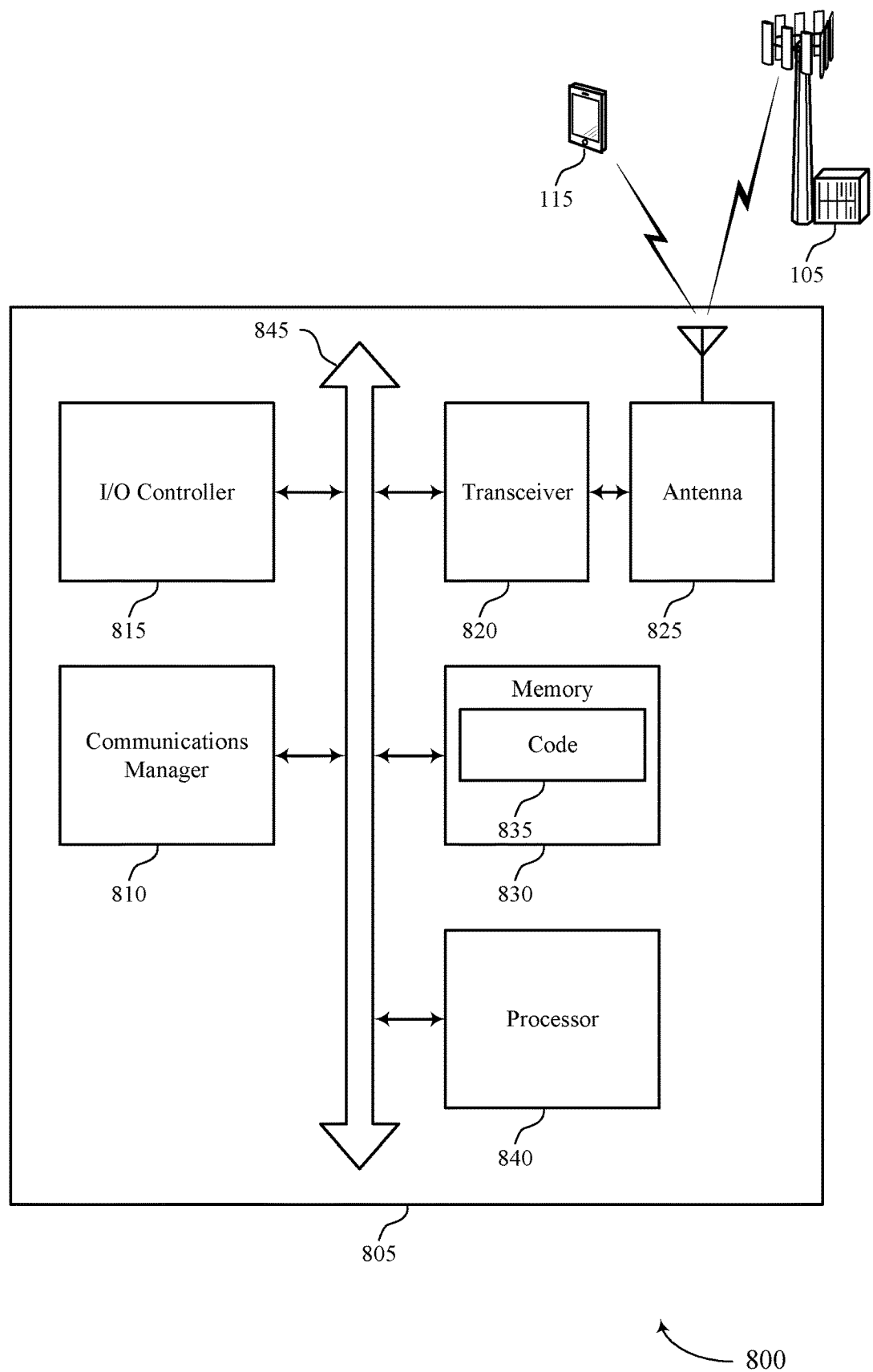
FIG. 8 shows a diagram of a system including a device that supports indication of system information update via a downlink shared channel in accordance with aspects of the present disclosure.

FIG. 8 shows a diagram of a system 800 including a device 805 that supports indication of system information update via a downlink shared channel in accordance with aspects of the present disclosure. The device 805 may be an example of or include the components of device 505, device 605, or a UE 115, an IAB node 205, or a device 305 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a communication link with a second device, communicate with the second device based on updating the system information, receive, from the second device based on establishing the communication link, DCI in a downlink control channel and a message in a downlink shared channel, the message including an indication of a system information update for the first device, determine the system information update for the first device based on receiving the DCI and the indication of the system information update in the message, and update the system information for the first device based on determining the system information update.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting indication of system information update via a downlink shared channel).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (e.g., when compiled and executed) to perform functions described herein.

Figure 9:
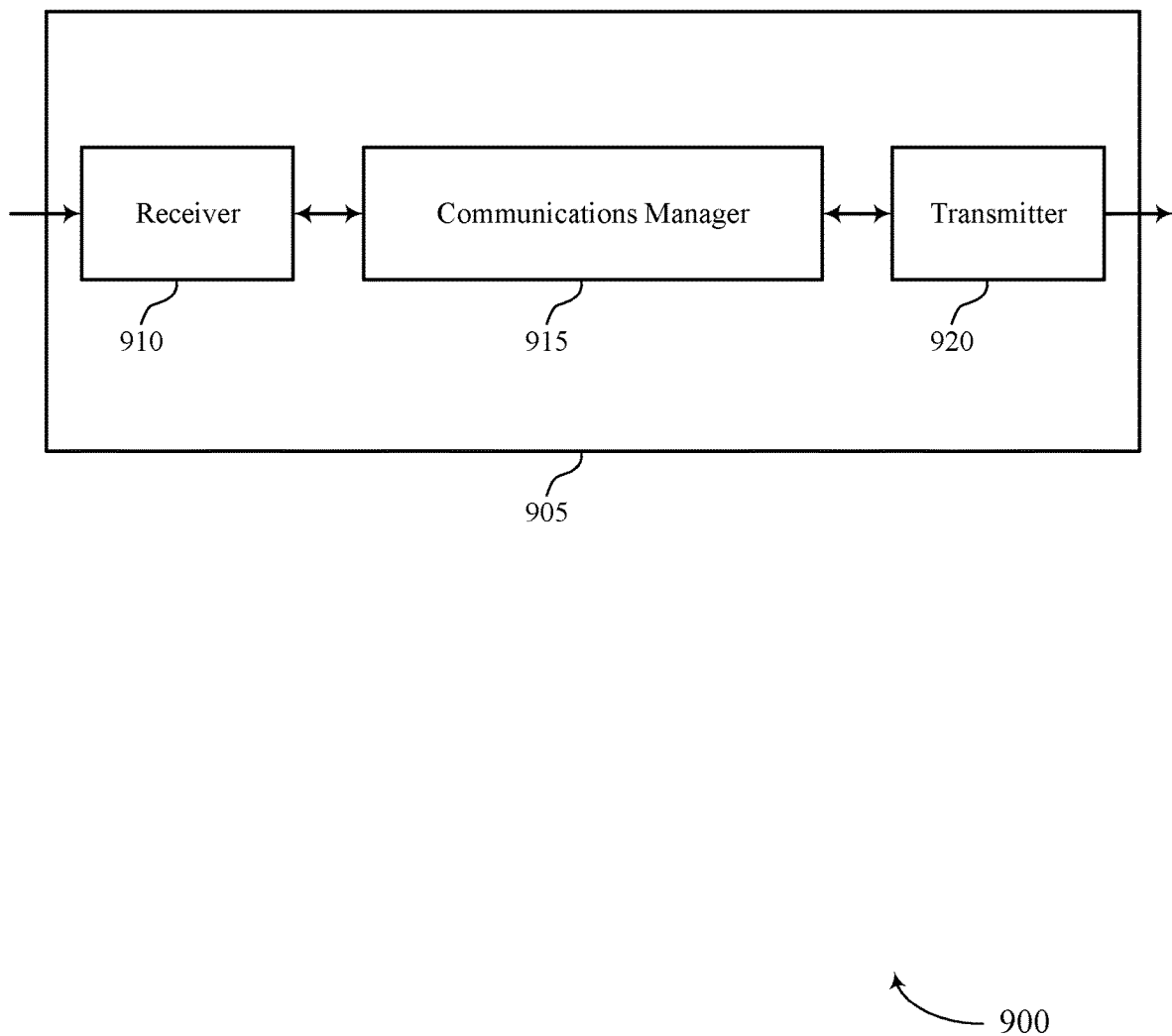
FIGS. 9 and 10 show block diagrams of devices that support indication of system information update via a downlink shared channel in accordance with aspects of the present disclosure.

FIG. 9 shows a block diagram 900 of a device 905 that supports indication of system information update via a downlink shared channel in accordance with aspects of the present disclosure. The device 905 may be an example of aspects of a base station 105, which may function as a parent IAB node or a central unit, as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to indication of system information update via a downlink shared channel, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a communication link with a group of devices, communicate with the first device in the group of devices based on transmitting the DCI and the indication of the system information update in the message, determine a system information update for a first device in the group of devices based on establishing the communication link, and transmit, to the first device based on determining the system information update, DCI in a downlink control channel and a message in a downlink shared channel, the message including an indication of a system information update for the first device. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

As described herein, the device 905 may provide a UE or an IAB node, or any served device, with a paging message in a PDSCH that may assist the UE or the IAB node in more efficiently acquiring system information. Further, the device 905 may avoid configuring UE-specific and IAB-specific RNTIs or UE-specific and IAB-specific search spaces or paging occasions, which may improve the resource efficiency of the system, enabling the device 905 to improve resource allocations to other devices, which may increase the achievable system throughput.

Figure 10:
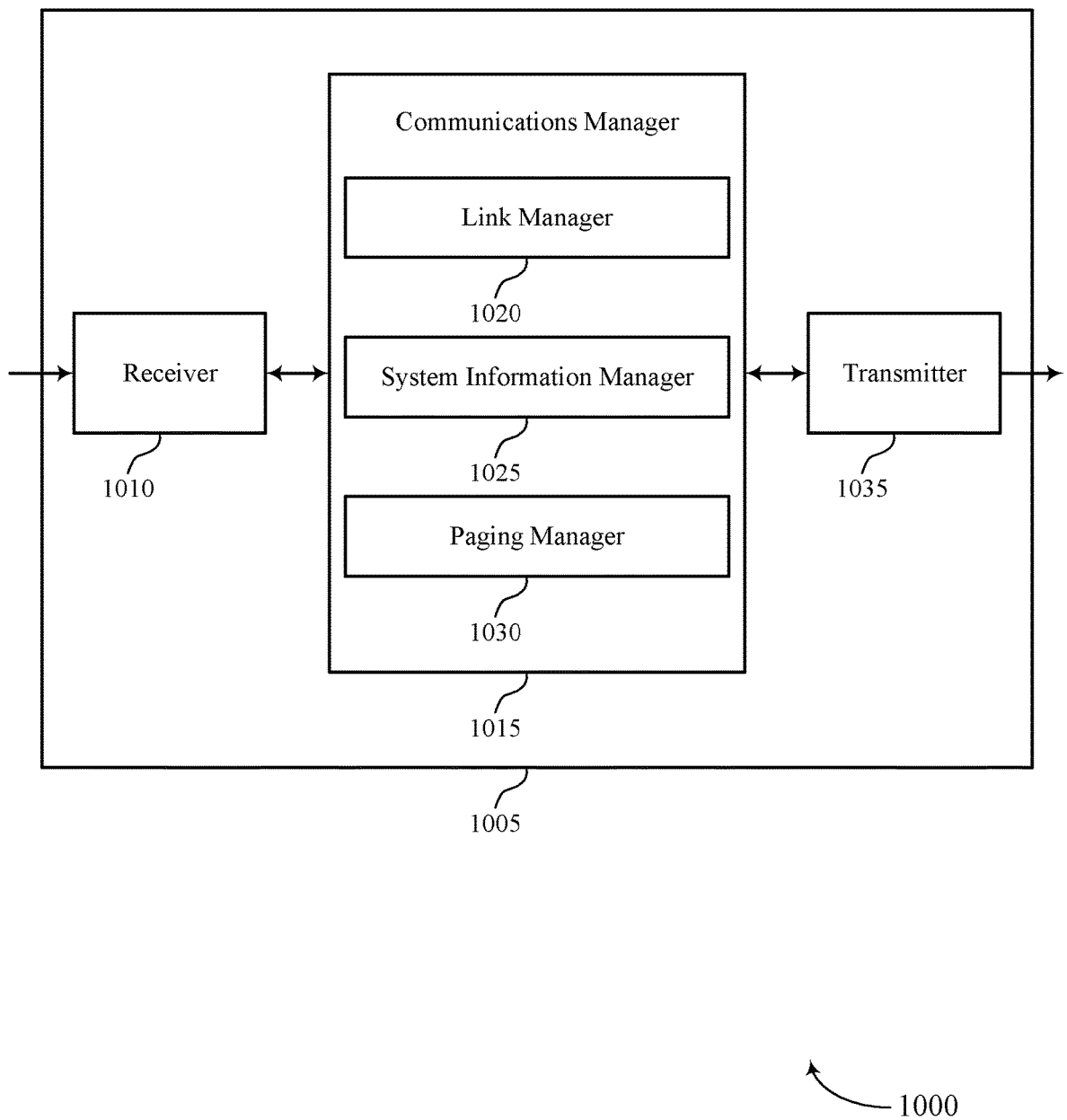

FIG. 10 shows a block diagram 1000 of a device 1005 that supports indication of system information update via a downlink shared channel in accordance with aspects of the present disclosure. The device 1005 may be an example of aspects of a device 905, or a base station 105, which may function as a parent IAB node or a central unit, as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to indication of system information update via a downlink shared channel, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a link manager 1020, a system information manager 1025, and a paging manager 1030. The communications manager 1015 may be an example of aspects of the communications manager 1210 described herein.

The link manager 1020 may establish a communication link with a group of devices and communicate with the first device in the group of devices based on transmitting the DCI and the indication of the system information update in the message. The system information manager 1025 may determine a system information update for a first device in the group of devices based on establishing the communication link. The paging manager 1030 may transmit, to the first device based on determining the system information update, DCI in a downlink control channel and a message in a downlink shared channel, the message including an indication of a system information update for the first device.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
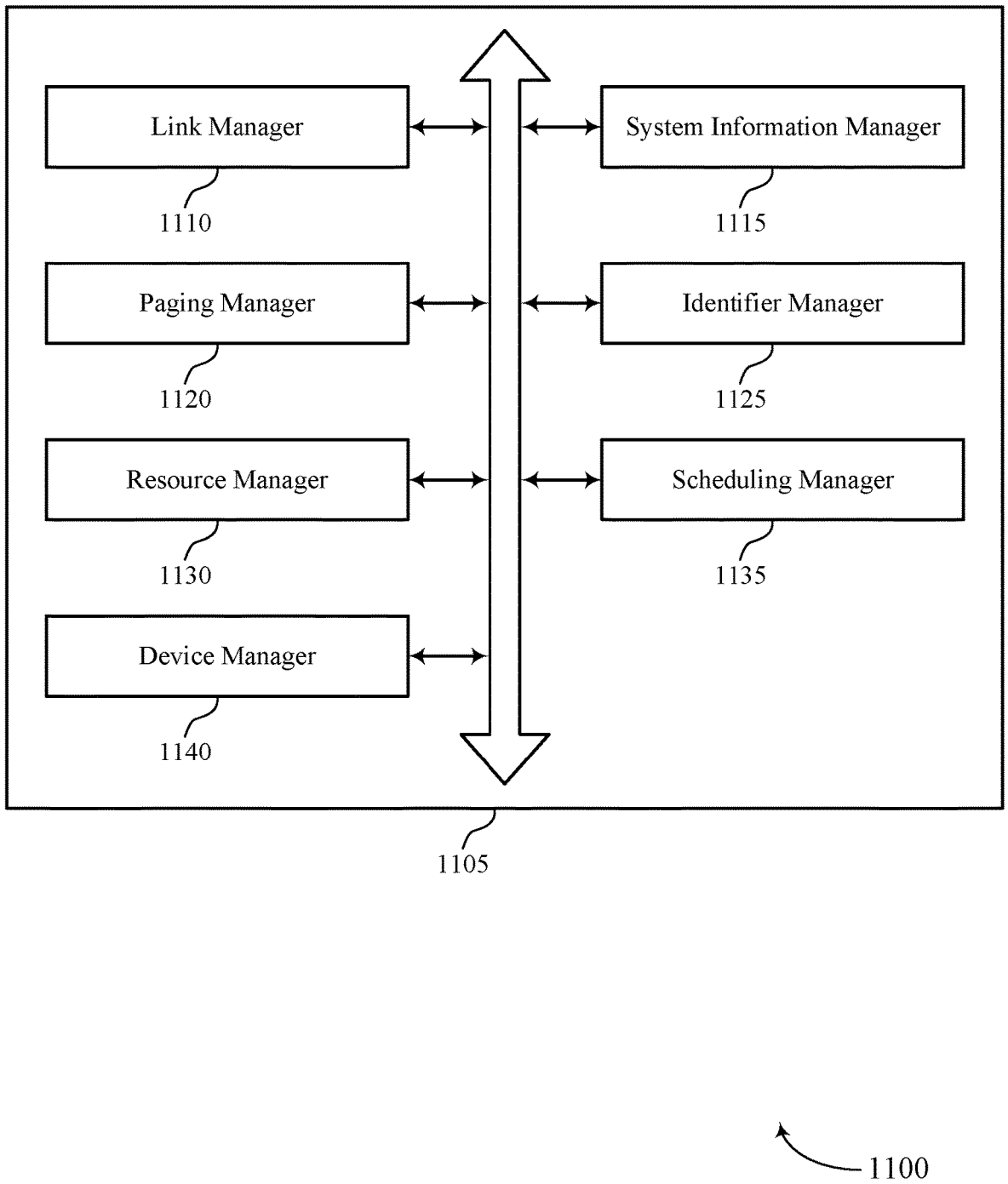
FIG. 11 shows a block diagram of a communications manager that supports indication of system information update via a downlink shared channel in accordance with aspects of the present disclosure.

FIG. 11 shows a block diagram 1100 of a communications manager 1105 that supports indication of system information update via a downlink shared channel in accordance with aspects of the present disclosure. The communications manager 1105 may be an example of aspects of a communications manager 915, a communications manager 1015, or a communications manager 1210 described herein. The communications manager 1105 may include a link manager 1110, a system information manager 1115, a paging manager 1120, an identifier manager 1125, a resource manager 1130, a scheduling manager 1135, and a device manager 1140. Each of these modules may communicate, directly or indirectly, with one another (e.g., via one or more buses).

The link manager 1110 may establish a communication link with a group of devices. In some examples, the link manager 1110 may communicate with the first device in the group of devices based on transmitting the DCI and the indication of the system information update in the message.

The system information manager 1115 may determine a system information update for a first device in the group of devices based on establishing the communication link. In some examples, the system information manager 1115 may transmit, in a payload on the shared channel, one or more system information parameters updated. In some examples, the one or more system IEs updated are associated with a cell selection parameter, a cell re-selection parameter, a cell measurement parameter, or any combination thereof. In some examples, the one or more system information parameters updated include one or more configuration parameters associated with a random access procedure.

The paging manager 1120 may transmit, to the first device based on determining the system information update, DCI in a downlink control channel and a message in a downlink shared channel, the message including an indication of a system information update for the first device. In some examples, the paging manager 1120 may transmit a flag of one or more bits. In some examples, the paging manager 1120 may transmit an indication of one or more SIBs updated.

In some examples, the paging manager 1120 may transmit an indication of one or more system IEs updated. In some examples, the paging manager 1120 may transmit an indication that the one or more system IEs updated are associated with a set of SIBs. In some examples, the paging manager 1120 may transmit a second indication of the system information update, and where determining the system information update for the first device is based on transmitting the indication of the system information update in the DCI.

In some examples, the paging manager 1120 may transmit a flag of one or more bits, transmitting an indication of one or more SIBs updated, transmitting an indication of one or more system IEs updated, or transmitting, in a payload on the shared channel, one or more system information parameters updated, or any combination thereof. In some examples, transmitting the second indication of the system information update in the DCI includes transmitting the indication of the system information update in a short message of the DCI.

In some examples, the paging manager 1120 may transmit the indication of the system information update in a field in the message. In some examples, the paging manager 1120 may transmit, in the message, an indication of one or more SIBs updated, an indication of one or more system IEs updated, one or more system information parameters updated, or any combination thereof.

In some examples, the paging manager 1120 may transmit, in the DCI, a flag of one or more bits associated with the first device, an indication of a paging identifier associated with the first device, an indication of paging search space associated with the first device, an indication of one or more paging occasions associated with the first device, or any combination thereof.

In some examples, the flag, the indication of the paging identifier, the indication of the paging search space, the indication of the one or more paging occasions, or any combination thereof is included in a short message of the DCI. In some examples, the message is a paging message in the downlink shared channel; and where a field in the message associated with the indication of the system information update is a paging record field.

The identifier manager 1125 may transmit an identifier associated with the field in the message, the identifier assigned to one or more devices in a group of devices including being assigned to the first device as one of the one or more devices in the group of devices. In some examples, the identifier manager 1125 may determine that the identifier associated with the field is assigned to the first device based on a class of the first device, a category of the first device, a mobility of the first device, a capability of the first device, or any combination thereof.

In some examples, the identifier manager 1125 may transmit a second identifier associated with the field or the second field in the message, the second identifier assigned to one or more devices in a second group of devices including being assigned to the first device as one of the one or more devices in the second group of devices.

The resource manager 1130 may determine a resource allocation for wireless communication. In some examples, the indication of the one or more paging occasions is based on a state of the first device, the state of the first device including an idle state, an inactive state, or a connected state.

The scheduling manager 1135 may determine scheduling information associated with wireless communication. In some examples, the indication of the system information update in the downlink shared channel includes scheduling information associated with an updated system information message. In some examples, the DCI schedules the message in the downlink shared channel.

The device manager 1140 may determine a class, a category, a type, a mobility, or a capability of a device. In some examples, the first device is associated with a first type of devices associated with a first type of service different than a second type of devices associated with a second type of service.

In some examples, a type of a device is based at least in part a class of the device, a category of the device, a mobility of the device, or a capability of the device, or any combination thereof. In some examples, the first device is an IAB node or a user equipment and the second device is a parent IAB node, a central unit, or a base station.

Figure 12:
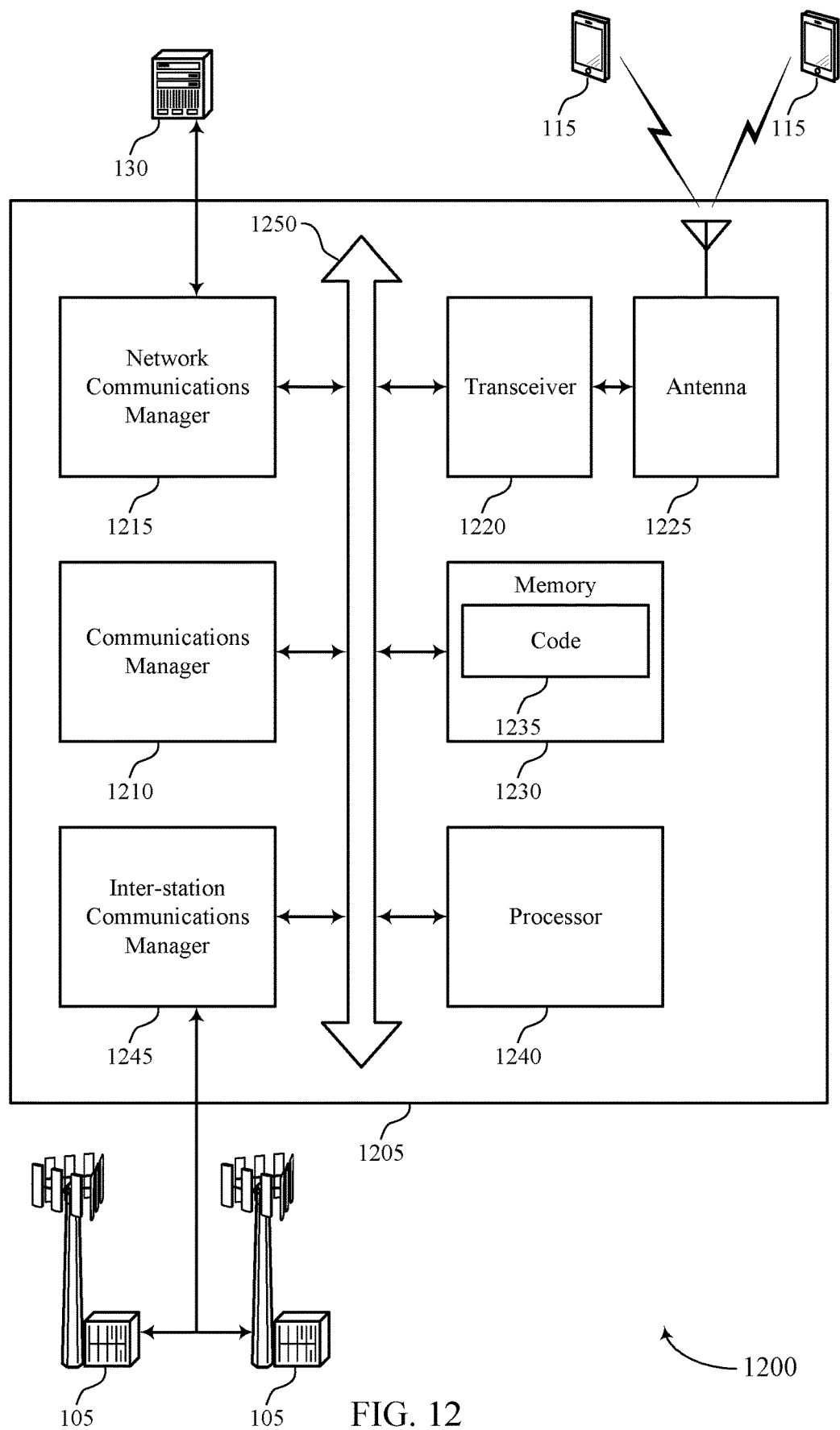
FIG. 12 shows a diagram of a system including a device that supports indication of system information update via a downlink shared channel in accordance with aspects of the present disclosure.

FIG. 12 shows a diagram of a system 1200 including a device 1205 that supports indication of system information update via a downlink shared channel in accordance with aspects of the present disclosure. The device 1205 may be an example of or include the components of device 905, device 1005, or a base station 105, which may function as a parent IAB node or a central unit, as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a communication link with a group of devices, communicate with the first device in the group of devices based on transmitting the DCI and the indication of the system information update in the message, determine a system information update for a first device in the group of devices based on establishing the communication link, and transmit, to the first device based on determining the system information update, DCI in a downlink control channel and a message in a downlink shared channel, the message including an indication of a system information update for the first device.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (e.g., the memory 1230) to cause the device 1205 to perform various functions (e.g., functions or tasks supporting indication of system information update via a downlink shared channel).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (e.g., when compiled and executed) to perform functions described herein.

Figure 13:
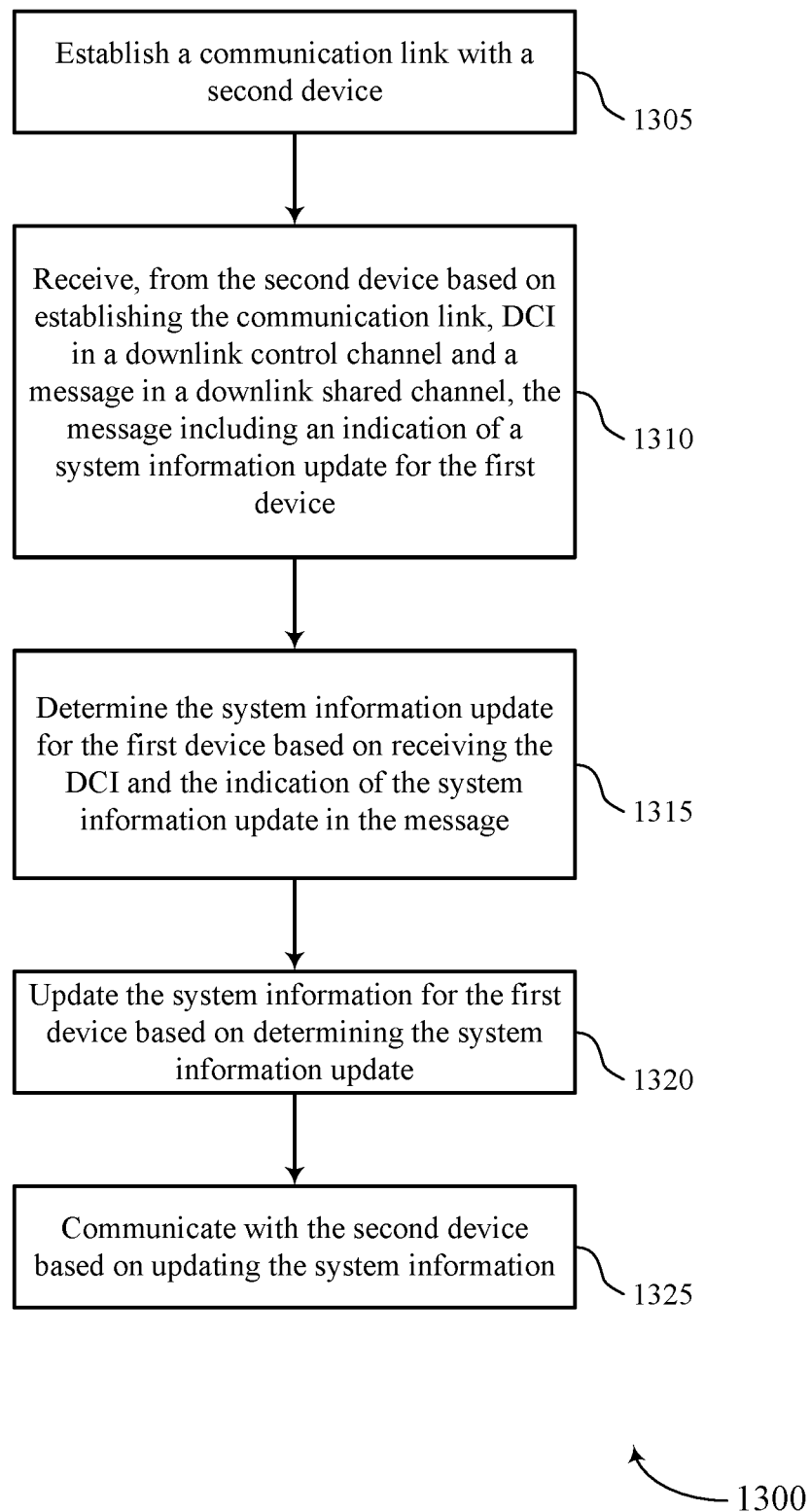
FIGS. 13 through 18 show flowcharts illustrating methods that support indication of system information update via a downlink shared channel in accordance with aspects of the present disclosure.

FIG. 13 shows a flowchart illustrating a method 1300 that supports indication of system information update via a downlink shared channel in accordance with aspects of the present disclosure. The operations of method 1300 may be implemented by a device, such as a UE 115 or an IAB node 205, or its components as described herein. For example, the operations of method 1300 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1305, the first device may establish a communication link with a second device. The operations of 1305 may be performed according to the methods described herein. In some examples, aspects of the operations of 1305 may be performed by a link manager as described with reference to FIGS. 5 through 8.

At 1310, the first device may receive, from the second device based on establishing the communication link, DCI in a downlink control channel and a message in a downlink shared channel, the message including an indication of a system information update for the first device. The operations of 1310 may be performed according to the methods described herein. In some examples, aspects of the operations of 1310 may be performed by a paging manager as described with reference to FIGS. 5 through 8.

At 1315, the first device may determine the system information update for the first device based on receiving the DCI and the indication of the system information update in the message. The operations of 1315 may be performed according to the methods described herein. In some examples, aspects of the operations of 1315 may be performed by a system information manager as described with reference to FIGS. 5 through 8.

At 1320, the first device may update the system information for the first device based on determining the system information update. The operations of 1320 may be performed according to the methods described herein. In some examples, aspects of the operations of 1320 may be performed by a system information manager as described with reference to FIGS. 5 through 8.

At 1325, the first device may communicate with the second device based on updating the system information. The operations of 1325 may be performed according to the methods described herein. In some examples, aspects of the operations of 1325 may be performed by a link manager as described with reference to FIGS. 5 through 8.

Figure 14:
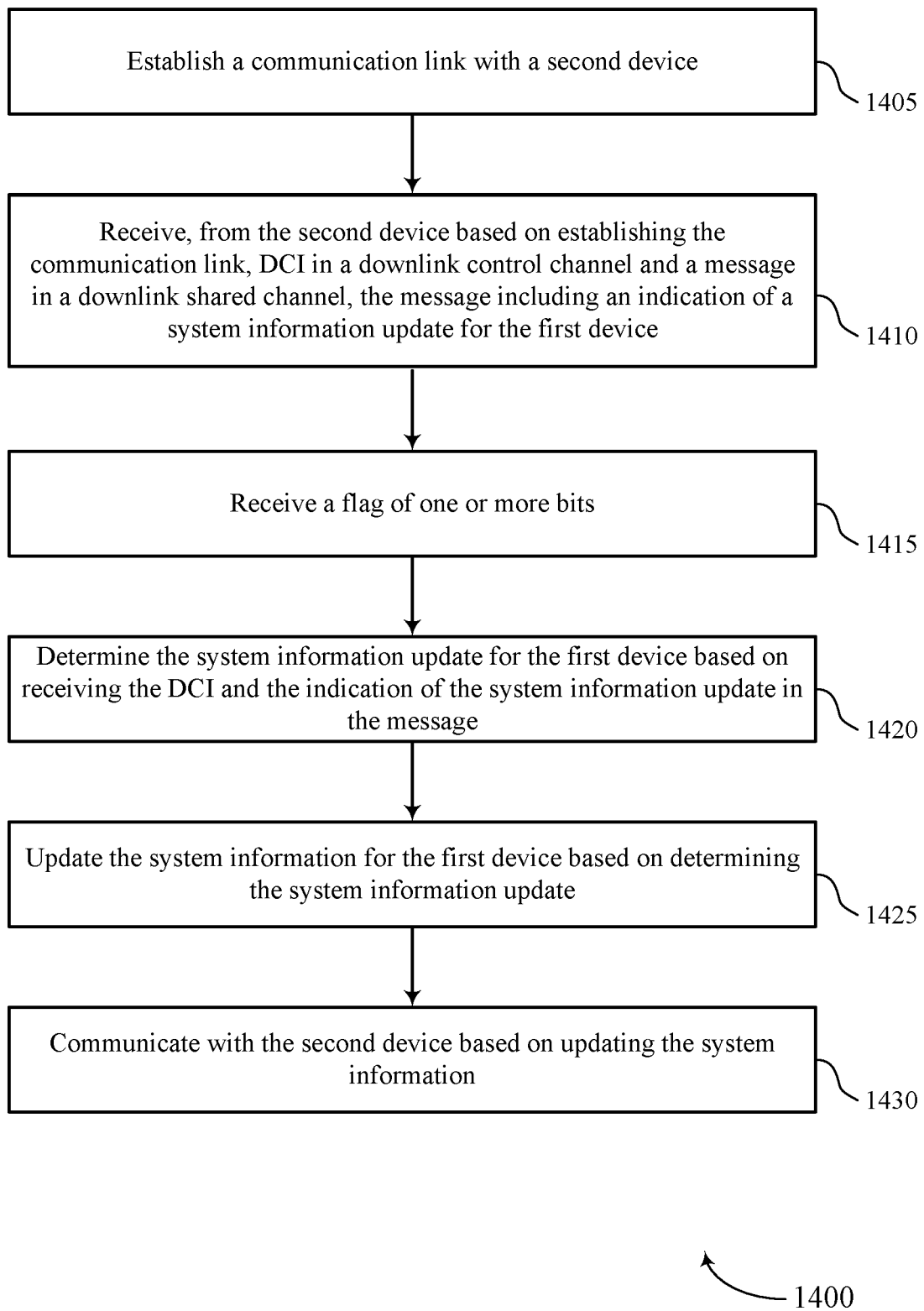

FIG. 14 shows a flowchart illustrating a method 1400 that supports indication of system information update via a downlink shared channel in accordance with aspects of the present disclosure. The operations of method 1400 may be implemented by a first device, such as a UE 115 or an IAB node 205, or its components as described herein. For example, the operations of method 1400 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1405, the first device may establish a communication link with a second device. The operations of 1405 may be performed according to the methods described herein. In some examples, aspects of the operations of 1405 may be performed by a link manager as described with reference to FIGS. 5 through 8.

At 1410, the first device may receive, from the second device based on establishing the communication link, DCI in a downlink control channel and a message in a downlink shared channel, the message including an indication of a system information update for the first device. The operations of 1410 may be performed according to the methods described herein. In some examples, aspects of the operations of 1410 may be performed by a paging manager as described with reference to FIGS. 5 through 8.

At 1415, the first device may receive a flag of one or more bits. In some examples, the first device may receive the flag of one or more bits within the message in the downlink shared channel. The operations of 1415 may be performed according to the methods described herein. In some examples, aspects of the operations of 1415 may be performed by a paging manager as described with reference to FIGS. 5 through 8.

At 1420, the first device may determine the system information update for the first device based on receiving the DCI and the indication of the system information update in the message. The operations of 1420 may be performed according to the methods described herein. In some examples, aspects of the operations of 1420 may be performed by a system information manager as described with reference to FIGS. 5 through 8.

At 1425, the first device may update the system information for the first device based on determining the system information update. The operations of 1425 may be performed according to the methods described herein. In some examples, aspects of the operations of 1425 may be performed by a system information manager as described with reference to FIGS. 5 through 8.

At 1430, the first device may communicate with the second device based on updating the system information. The operations of 1430 may be performed according to the methods described herein. In some examples, aspects of the operations of 1430 may be performed by a link manager as described with reference to FIGS. 5 through 8.

Figure 15:
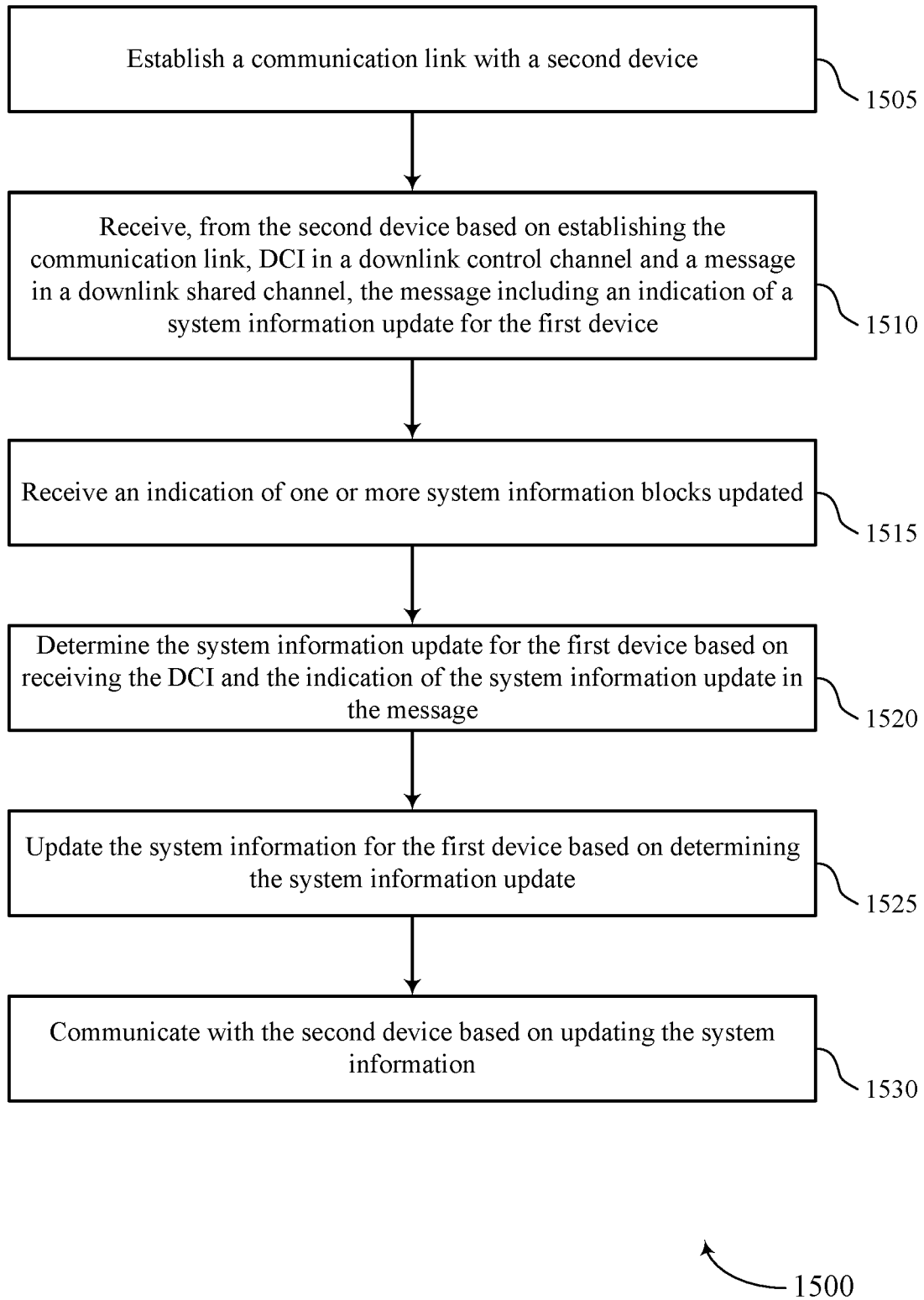

FIG. 15 shows a flowchart illustrating a method 1500 that supports indication of system information update via a downlink shared channel in accordance with aspects of the present disclosure. The operations of method 1500 may be implemented by a first device, such as a UE 115 or an IAB node 205, or its components as described herein. For example, the operations of method 1500 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1505, the first device may establish a communication link with a second device. The operations of 1505 may be performed according to the methods described herein. In some examples, aspects of the operations of 1505 may be performed by a link manager as described with reference to FIGS. 5 through 8.

At 1510, the first device may receive, from the second device based on establishing the communication link, DCI in a downlink control channel and a message in a downlink shared channel, the message including an indication of a system information update for the first device. The operations of 1510 may be performed according to the methods described herein. In some examples, aspects of the operations of 1510 may be performed by a paging manager as described with reference to FIGS. 5 through 8.

At 1515, the first device may receive an indication of one or more SIBs updated. In some examples, the first device may receive the indication of the one or more SIBs in the message in the downlink shared channel. The operations of 1515 may be performed according to the methods described herein. In some examples, aspects of the operations of 1515 may be performed by a paging manager as described with reference to FIGS. 5 through 8.

At 1520, the first device may determine the system information update for the first device based on receiving the DCI and the indication of the system information update in the message. The operations of 1520 may be performed according to the methods described herein. In some examples, aspects of the operations of 1520 may be performed by a system information manager as described with reference to FIGS. 5 through 8.

At 1525, the first device may update the system information for the first device based on determining the system information update. The operations of 1525 may be performed according to the methods described herein. In some examples, aspects of the operations of 1525 may be performed by a system information manager as described with reference to FIGS. 5 through 8.

At 1530, the first device may communicate with the second device based on updating the system information. The operations of 1530 may be performed according to the methods described herein. In some examples, aspects of the operations of 1530 may be performed by a link manager as described with reference to FIGS. 5 through 8.

Figure 16:
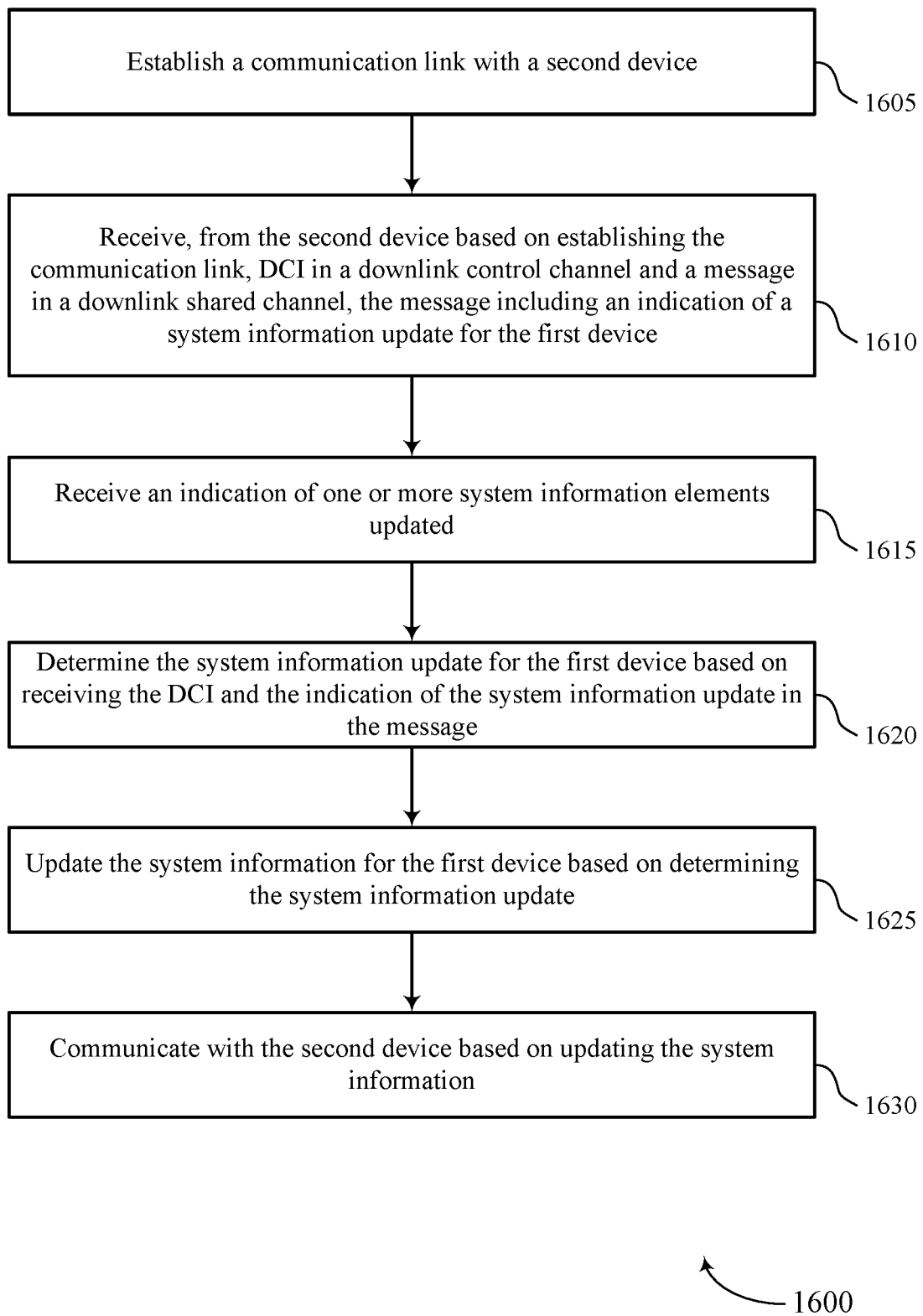

FIG. 16 shows a flowchart illustrating a method 1600 that supports indication of system information update via a downlink shared channel in accordance with aspects of the present disclosure. The operations of method 1600 may be implemented by a first device, such as a UE 115 or an IAB node 205, or its components as described herein. For example, the operations of method 1600 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1605, the first device may establish a communication link with a second device. The operations of 1605 may be performed according to the methods described herein. In some examples, aspects of the operations of 1605 may be performed by a link manager as described with reference to FIGS. 5 through 8.

At 1610, the first device may receive, from the second device based on establishing the communication link, DCI in a downlink control channel and a message in a downlink shared channel, the message including an indication of a system information update for the first device. The operations of 1610 may be performed according to the methods described herein. In some examples, aspects of the operations of 1610 may be performed by a paging manager as described with reference to FIGS. 5 through 8.

At 1615, the first device may receive an indication of one or more system IEs updated. In some examples, the first device may receive the indication of the one or more IEs updated in the message in the downlink shared channel. The operations of 1615 may be performed according to the methods described herein. In some examples, aspects of the operations of 1615 may be performed by a paging manager as described with reference to FIGS. 5 through 8.

At 1620, the first device may determine the system information update for the first device based on receiving the DCI and the indication of the system information update in the message. The operations of 1620 may be performed according to the methods described herein. In some examples, aspects of the operations of 1620 may be performed by a system information manager as described with reference to FIGS. 5 through 8.

At 1625, the first device may update the system information for the first device based on determining the system information update. The operations of 1625 may be performed according to the methods described herein. In some examples, aspects of the operations of 1625 may be performed by a system information manager as described with reference to FIGS. 5 through 8.

At 1630, the device may communicate with the second device based on updating the system information. The operations of 1630 may be performed according to the methods described herein. In some examples, aspects of the operations of 1630 may be performed by a link manager as described with reference to FIGS. 5 through 8.

Figure 17:
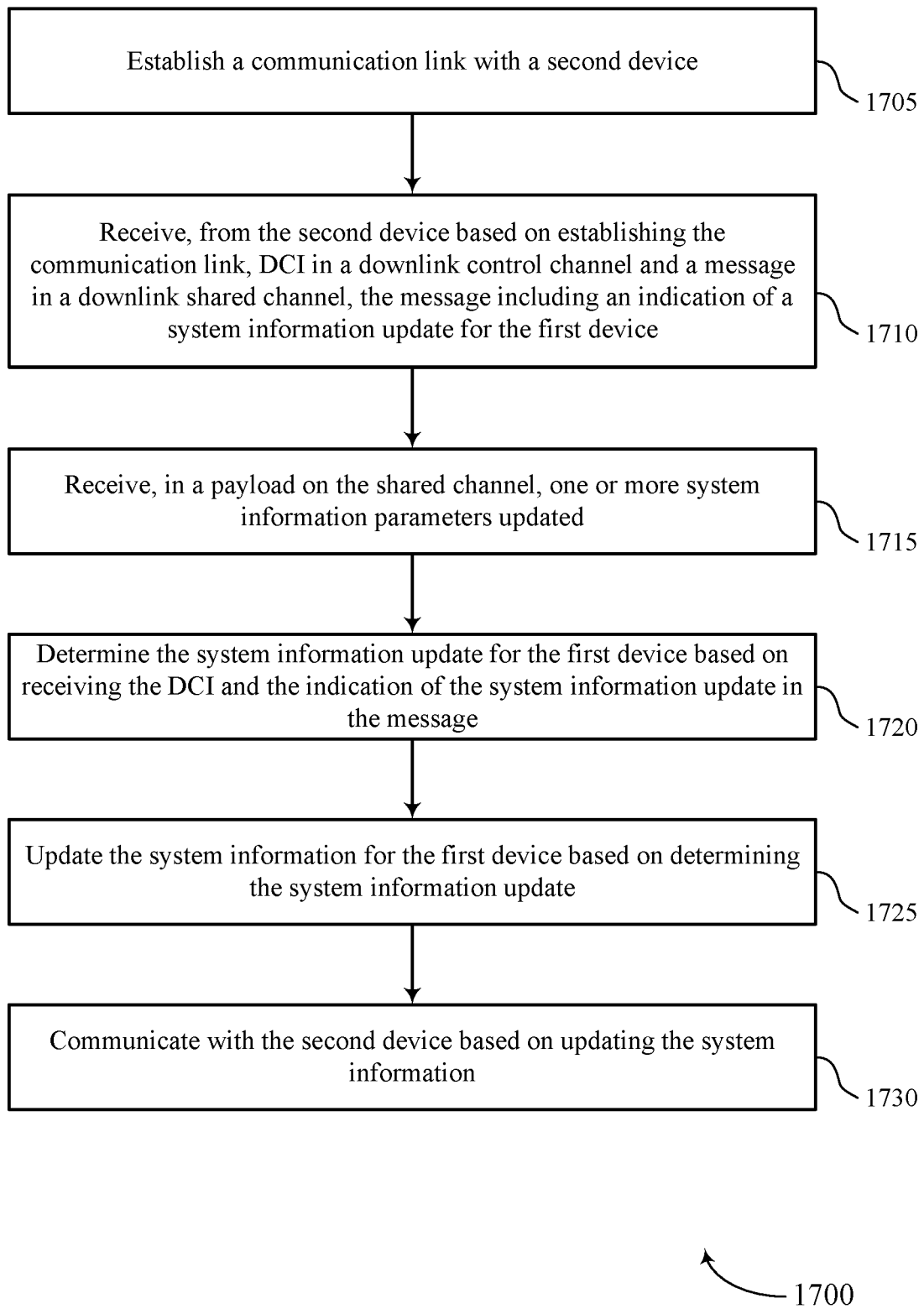

FIG. 17 shows a flowchart illustrating a method 1700 that supports indication of system information update via a downlink shared channel in accordance with aspects of the present disclosure. The operations of method 1700 may be implemented by a by a first device, such as a UE 115 or an IAB node 205, or its components as described herein. For example, the operations of method 1700 may be performed by a communications manager as described with reference to FIGS. 5 through 8. In some examples, a first device may execute a set of instructions to control the functional elements of the first device to perform the functions described below. Additionally or alternatively, a first device may perform aspects of the functions described below using special-purpose hardware.

At 1705, the first device may establish a communication link with a second device. The operations of 1705 may be performed according to the methods described herein. In some examples, aspects of the operations of 1705 may be performed by a link manager as described with reference to FIGS. 5 through 8.

At 1710, the first device may receive, from the second device based on establishing the communication link, DCI in a downlink control channel and a message in a downlink shared channel, the message including an indication of a system information update for the first device. The operations of 1710 may be performed according to the methods described herein. In some examples, aspects of the operations of 1710 may be performed by a paging manager as described with reference to FIGS. 5 through 8.

At 1715, the first device may receive, in a payload on the shared channel, one or more system information parameters updated. In some examples, the first device may receive the one or more system information parameters updated in the message in the downlink shared channel. The operations of 1715 may be performed according to the methods described herein. In some examples, aspects of the operations of 1715 may be performed by a system information manager as described with reference to FIGS. 5 through 8.

At 1720, the first device may determine the system information update for the first device based on receiving the DCI and the indication of the system information update in the message. The operations of 1720 may be performed according to the methods described herein. In some examples, aspects of the operations of 1720 may be performed by a system information manager as described with reference to FIGS. 5 through 8.

At 1725, the first device may update the system information for the first device based on determining the system information update. The operations of 1725 may be performed according to the methods described herein. In some examples, aspects of the operations of 1725 may be performed by a system information manager as described with reference to FIGS. 5 through 8.

At 1730, the first device may communicate with the second device based on updating the system information. The operations of 1730 may be performed according to the methods described herein. In some examples, aspects of the operations of 1730 may be performed by a link manager as described with reference to FIGS. 5 through 8.

Figure 18:
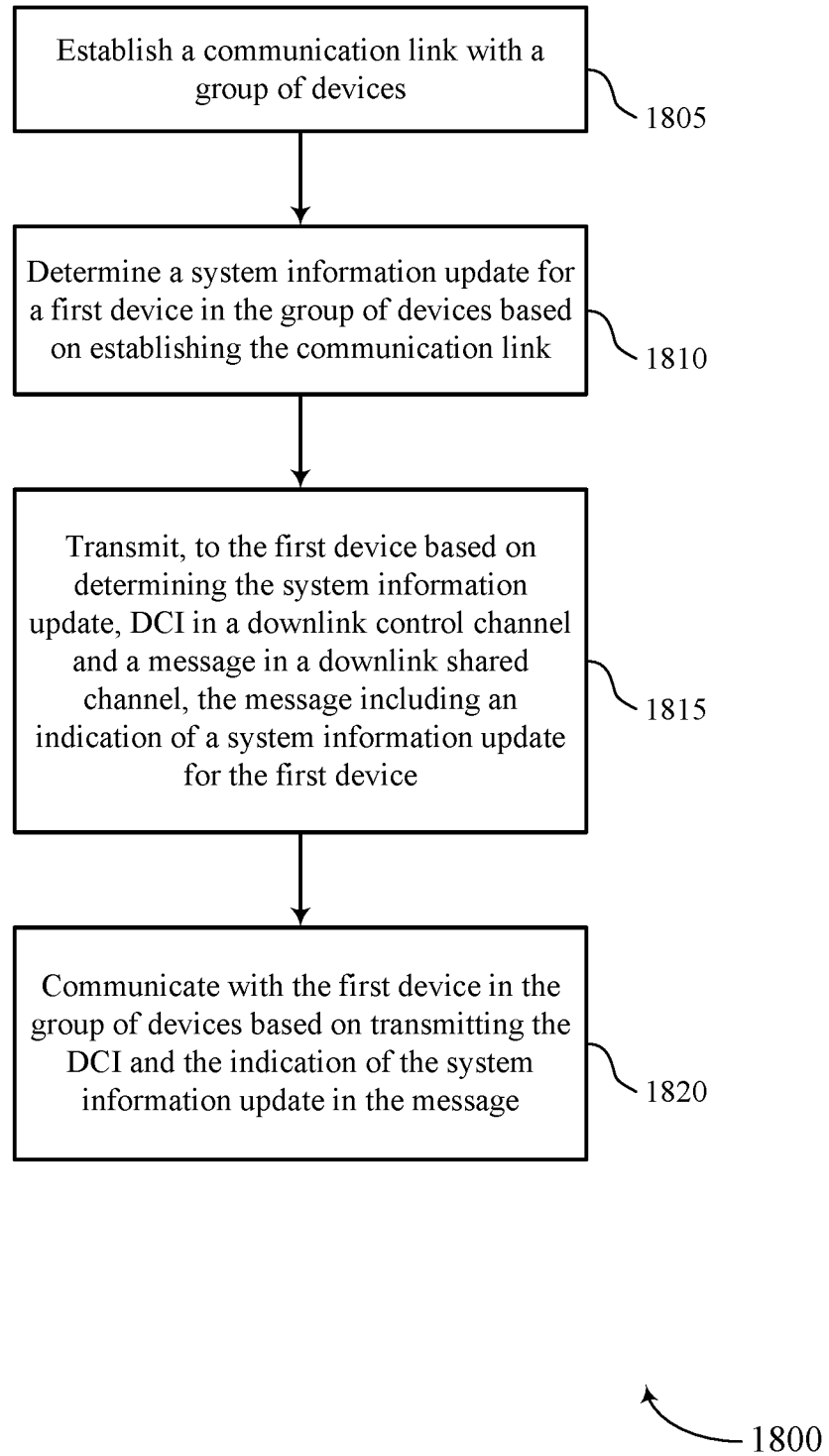

FIG. 18 shows a flowchart illustrating a method 1800 that supports indication of system information update via a downlink shared channel in accordance with aspects of the present disclosure. The operations of method 1800 may be implemented by a second device, such as a base station 105, which may function as a parent IAB node or a central unit, or its components as described herein. For example, the operations of method 1800 may be performed by a communications manager as described with reference to FIGS. 9 through 12. In some examples, a second device may execute a set of instructions to control the functional elements of the second device to perform the functions described below. Additionally or alternatively, a second device may perform aspects of the functions described below using special-purpose hardware.

At 1805, the second device may establish a communication link with a group of devices. The operations of 1805 may be performed according to the methods described herein. In some examples, aspects of the operations of 1805 may be performed by a link manager as described with reference to FIGS. 9 through 12.

At 1810, the second device may determine a system information update for a first device in the group of devices based on establishing the communication link. The operations of 1810 may be performed according to the methods described herein. In some examples, aspects of the operations of 1810 may be performed by a system information manager as described with reference to FIGS. 9 through 12.

At 1815, the second device may transmit, to the first device based on determining the system information update, DCI in a downlink control channel and a message in a downlink shared channel, the message including an indication of a system information update for the first device. The operations of 1815 may be performed according to the methods described herein. In some examples, aspects of the operations of 1815 may be performed by a paging manager as described with reference to FIGS. 9 through 12.

At 1820, the second device may communicate with the first device in the group of devices based on transmitting the DCI and the indication of the system information update in the message. The operations of 1820 may be performed according to the methods described herein. In some examples, aspects of the operations of 1820 may be performed by a link manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device, comprising: establishing a communication link with a second device; receiving, from the second device based at least in part on establishing the communication link, downlink control information in a downlink control channel and a message in a downlink shared channel, the message comprising an indication of a system information update for the first device; determining the system information update for the first device based at least in part on receiving the downlink control information and the indication of the system information update in the message; updating the system information for the first device based at least in part on determining the system information update; and communicating with the second device based at least in part on updating the system information.

Aspect 2: The method of aspect 1, wherein receiving the indication of the system information update in the message comprises: receiving a flag of one or more bits.

Aspect 3: The method of any of aspects 1 through 2, wherein receiving the indication of the system information update comprises: receiving an indication of one or more system information blocks updated.

Aspect 4: The method of any of aspects 1 through 3, wherein receiving the indication of the system information update comprises: receiving an indication of one or more system information elements updated.

Aspect 5: The method of aspect 4, wherein receiving the indication of the one or more system information elements updated comprises: receiving an indication that the one or more system information elements updated are associated with a plurality of system information blocks.

Aspect 6: The method of aspect 5, wherein the one or more system information elements updated are associated with a cell selection parameter, a cell re-selection parameter, a cell measurement parameter, or any combination thereof.

Aspect 7: The method of any of aspects 1 through 6, wherein receiving the indication of the system information update comprises: receiving, in a payload on the downlink shared channel, one or more system information parameters updated.

Aspect 8: The method of aspect 7, wherein the one or more system information parameters updated comprise one or more configuration parameters associated with a random access procedure.

Aspect 9: The method of any of aspects 1 through 8, wherein receiving the downlink control information comprises: receiving a second indication of the system information update, and wherein determining the system information update for the first device is based at least in part on receiving the second indication of the system information update in the downlink control information.

Aspect 10: The method of aspect 9, wherein receiving the indication of the system information update for the first device in the message comprises: receiving a flag of one or more bits, receiving an indication of one or more system information blocks updated, receiving an indication of one or more system information elements updated, or receiving, in a payload on the downlink shared channel, one or more system information parameters updated, or any combination thereof.

Aspect 11: The method of any of aspects 9 through 10, wherein receiving the second indication of the system information update in the downlink control information comprises receiving the indication of the system information update in a short message of the downlink control information.

Aspect 12: The method of any of aspects 1 through 11, wherein receiving the indication of the system information update comprises: receiving the indication of the system information update in a field in the message.

Aspect 13: The method of aspect 12, wherein receiving the indication of the system information update in the field in the message comprises: receiving an identifier associated with the field in the message, the identifier assigned to one or more devices in a group of devices including being assigned to the first device as one of the one or more devices in the group of devices, the method further comprising; and determining that the identifier associated with the field in the message is assigned to the first device, wherein updating the system information for the first device is based at least in part on determining that the identifier associated with the field in the message is assigned to the first device.

Aspect 14: The method of aspect 13, wherein determining that the identifier associated with the field in the message is assigned to the first device is based at least in part on a class of the first device, a category of the first device, a mobility of the first device, a capability of the first device, or any combination thereof.

Aspect 15: The method of any of aspects 12 through 14, wherein receiving the indication of the system information update in the field or a second field in the message comprises: receiving a second identifier associated with the field or the second field in the message, the second identifier assigned to one or more devices in a second group of devices including being assigned to the first device as one of the one or more devices in the second group of devices, the method further comprising; and determining that the second identifier associated with the field or the second field in the message is assigned to the first device, wherein updating the system information for the first device is based at least in part on determining that the identifier associated with the field or the second field in the message is assigned to the first device.

Aspect 16: The method of any of aspects 1 through 15, wherein receiving the indication of the system information update comprises: receiving, in the message, an indication of one or more system information blocks updated, an indication of one or more system information elements updated, one or more system information parameters updated, or any combination thereof; and receiving, in the downlink control information, a flag of one or more bits associated with the first device, an indication of a paging identifier associated with the first device, an indication of paging search space associated with the first device, an indication of one or more paging occasions associated with the first device, or any combination thereof.

Aspect 17: The method of aspect 16, wherein the flag, the indication of the paging identifier, the indication of the paging search space, the indication of the one or more paging occasions, or any combination thereof is included in a short message of the downlink control information.

Aspect 18: The method of any of aspects 16 through 17, wherein the indication of the one or more paging occasions is based at least in part on a state of the first device, the state of the first device comprising an idle state, an inactive state, or a connected state.

Aspect 19: The method of any of aspects 1 through 18, wherein the indication of the system information update in the downlink shared channel comprises scheduling information associated with an updated system information message.

Aspect 20: The method of any of aspects 1 through 19, wherein the first device is associated with a first type of devices associated with a first type of service different than a second type of devices associated with a second type of service.

Aspect 21: The method of aspect 20, wherein a type of a device is based at least in part a class of the device, a category of the device, a mobility of the device, or a capability of the device, or any combination thereof.

Aspect 22: The method of any of aspects 1 through 21, wherein the message is a paging message in the downlink shared channel; and a field in the message associated with the indication of the system information update is a paging record field.

Aspect 23: The method of any of aspects 1 through 22, wherein the first device is a child integrated access and backhaul node or a user equipment and the second device is a parent integrated access and backhaul node, a central unit, or a base station.

Aspect 24: The method of any of aspects 1 through 23, wherein the downlink control information schedules the message in the downlink shared channel.

Aspect 25: A method for wireless communication at a second device, comprising: establishing a communication link with a group of devices; determining a system information update for a first device in the group of devices based at least in part on establishing the communication link; transmitting, to the first device based at least in part on determining the system information update, downlink control information in a downlink control channel and a message in a downlink shared channel, the message comprising an indication of a system information update for the first device; and communicating with the first device in the group of devices based at least in part on transmitting the downlink control information and the indication of the system information update in the message.

Aspect 26: The method of aspect 25, wherein transmitting the indication of the system information update in the message comprises: transmitting a flag of one or more bits.

Aspect 27: The method of any of aspects 25 through 26, wherein transmitting the indication of the system information update comprises: transmitting an indication of one or more system information blocks updated.

Aspect 28: The method of any of aspects 25 through 27, wherein transmitting the indication of the system information update comprises: transmitting an indication of one or more system information elements updated.

Aspect 29: The method of aspect 28, wherein transmitting the indication of the one or more system information elements updated comprises: transmitting an indication that the one or more system information elements updated are associated with a plurality of system information blocks.

Aspect 30: The method of aspect 29, wherein the one or more system information elements updated are associated with a cell selection parameter, a cell re-selection parameter, a cell measurement parameter, or any combination thereof.

Aspect 31: The method of any of aspects 25 through 30, wherein transmitting the indication of the system information update comprises: transmitting, in a payload on the downlink shared channel, one or more system information parameters updated.

Aspect 32: The method of aspect 31, wherein the one or more system information parameters updated comprise one or more configuration parameters associated with a random access procedure.

Aspect 33: The method of any of aspects 25 through 32, wherein transmitting the downlink control information comprises: transmitting a second indication of the system information update, and wherein determining the system information update for the first device is based at least in part on transmitting the indication of the system information update in the downlink control information.

Aspect 34: The method of aspect 33, wherein transmitting the indication of the system information update for the first device in the message comprises: transmitting a flag of one or more bits, transmitting an indication of one or more system information blocks updated, transmitting an indication of one or more system information elements updated, or transmitting, in a payload on the downlink shared channel, one or more system information parameters updated, or any combination thereof.

Aspect 35: The method of any of aspects 33 through 34, wherein transmitting the second indication of the system information update in the downlink control information comprises transmitting the indication of the system information update in a short message of the downlink control information.

Aspect 36: The method of any of aspects 25 through 35, wherein transmitting the indication of the system information update comprises: transmitting the indication of the system information update in a field in the message.

Aspect 37: The method of aspect 36, wherein transmitting the indication of the system information update in the field in the message comprises: transmitting an identifier associated with the field in the message, the identifier assigned to one or more devices in a the group of devices including being assigned to the first device as one of the one or more devices in the group of devices.

Aspect 38: The method of aspect 37, further comprising: determining that the identifier associated with the field is assigned to the first device based at least in part on a class of the first device, a category of the first device, a mobility of the first device, a capability of the first device, or any combination thereof.

Aspect 39: The method of any of aspects 36 through 38, where transmitting the indication of the system information update in the field or a second field in the message comprises: transmitting a second identifier associated with the field or the second field in the message, the second identifier assigned to one or more devices in a second group of devices including being assigned to the first device as one of the one or more devices in the second group of devices.

Aspect 40: The method of any of aspects 25 through 39, wherein transmitting the indication of the system information update comprises: transmitting, in the message, an indication of one or more system information blocks updated, an indication of one or more system information elements updated, one or more system information parameters updated, or any combination thereof; and transmitting, in the downlink control information, a flag of one or more bits associated with the first device, an indication of a paging identifier associated with the first device, an indication of paging search space associated with the first device, an indication of one or more paging occasions associated with the first device, or any combination thereof.

Aspect 41: The method of aspect 40, wherein the flag, the indication of the paging identifier, the indication of the paging search space, the indication of the one or more paging occasions, or any combination thereof is included in a short message of the downlink control information.

Aspect 42: The method of any of aspects 40 through 41, wherein the indication of the one or more paging occasions is based at least in part on a state of the first device, the state of the first device comprising an idle state, an inactive state, or a connected state.

Aspect 43: The method of any of aspects 25 through 42, wherein the indication of the system information update in the downlink shared channel comprises scheduling information associated with an updated system information message.

Aspect 44: The method of any of aspects 25 through 43, wherein the first device is associated with a first type of devices associated with a first type of service different than a second type of devices associated with a second type of service.

Aspect 45: The method of aspect 44, wherein a type of a device is based at least in part a class of the device, a category of the device, a mobility of the device, or a capability of the device, or any combination thereof.

Aspect 46: The method of any of aspects 25 through 45, wherein the message is a paging message in the downlink shared channel; and a field in the message associated with the indication of the system information update is a paging record field.

Aspect 47: The method of any of aspects 25 through 46, wherein the first device is an integrated access and backhaul node or a user equipment and the second device is a parent integrated access and backhaul node, a central unit, or a base station.

Aspect 48: The method of any of aspects 25 through 47, wherein the downlink control information schedules the message in the downlink shared channel.

Aspect 49: An apparatus for wireless communication at a first device, comprising a processor; memory coupled with the processor; and instructions stored in the memory and executable by the processor to cause the apparatus to perform a method of any of aspects 1 through 24.

Aspect 50: An apparatus for wireless communication at a first device, comprising at least one means for performing a method of any of aspects 1 through 24.

Aspect 51: A non-transitory computer-readable medium storing code for wireless communication at a first device, the code comprising instructions executable by a processor to perform a method of any of aspects 1 through 24.

Aspect 52: An apparatus for wireless communication at a second device, comprising a processor; memory coupled with the processor; and instructions stored in the memory and executable by the processor to cause the apparatus to perform a method of any of aspects 25 through 48.

Aspect 53: An apparatus for wireless communication at a second device, comprising at least one means for performing a method of any of aspects 25 through 48.

Aspect 54: A non-transitory computer-readable medium storing code for wireless communication at a second device, the code comprising instructions executable by a processor to perform a method of any of aspects 25 through 48.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
    establishing a communication link with a second device;
    receiving, from the second device based at least in part on establishing the communication link, downlink control information in a downlink control channel and a message in a downlink shared channel, the message comprising an indication of a system information update for the first device and one or more updated system information elements that are associated with a cell selection parameter, a cell re-selection parameter, a cell measurement parameter, or any combination thereof;
    determining the system information update for the first device based at least in part on receiving the downlink control information and the indication of the system information update in the message;
    updating system information for the first device based at least in part on determining the system information update; and
    communicating with the second device based at least in part on updating the system information.

2. The method of claim 1, wherein receiving the indication of the system information update in the message comprises:
    receiving a flag of one or more bits.

3. The method of claim 1, wherein receiving the indication of the system information update comprises:
    receiving an indication of one or more system information blocks updated.

4. The method of claim 1, wherein receiving the indication of the system information update comprises:
    receiving an indication that one or more system information elements updated are associated with a plurality of system information blocks.

5. The method of claim 1, wherein receiving the indication of the system information update comprises:
    receiving, in a payload on the downlink shared channel, one or more system information parameters updated, wherein the one or more system information parameters updated comprise one or more configuration parameters associated with a random access procedure.

6. The method of claim 1, wherein receiving the downlink control information comprises:
    receiving a second indication of the system information update, and wherein determining the system information update for the first device is based at least in part on receiving the second indication of the system information update in the downlink control information.

7. The method of claim 6, wherein receiving the indication of the system information update for the first device in the message comprises:
    receiving a flag of one or more bits, receiving an indication of one or more system information blocks updated, receiving an indication of one or more system information elements updated, or receiving, in a payload on the downlink shared channel, one or more system information parameters updated, or any combination thereof.

8. The method of claim 6, wherein:
    receiving the second indication of the system information update in the downlink control information comprises receiving the indication of the system information update in a short message of the downlink control information.

9. The method of claim 1, wherein receiving the indication of the system information update comprises:
    receiving the indication of the system information update in a field in the message.

10. The method of claim 9, wherein receiving the indication of the system information update in the field in the message comprises:
    receiving an identifier associated with the field in the message, the identifier assigned to one or more devices in a group of devices including being assigned to the first device as one of the one or more devices in the group of devices, the method further comprising; and
    determining that the identifier associated with the field in the message is assigned to the first device is based at least in part on a class of the first device, a category of the first device, a mobility of the first device, a capability of the first device, or any combination thereof, wherein updating the system information for the first device is based at least in part on determining that the identifier associated with the field in the message is assigned to the first device.

11. The method of claim 9, wherein receiving the indication of the system information update in the field or a second field in the message comprises:
    receiving a second identifier associated with the field or the second field in the message, the second identifier assigned to one or more devices in a second group of devices including being assigned to the first device as one of the one or more devices in the second group of devices, the method further comprising; and
    determining that the second identifier associated with the field or the second field in the message is assigned to the first device, wherein updating the system information for the first device is based at least in part on determining that the identifier associated with the field or the second field in the message is assigned to the first device.

12. The method of claim 1, wherein receiving the indication of the system information update comprises:
    receiving, in the message, an indication of one or more system information blocks updated, an indication of one or more system information elements updated, one or more system information parameters updated, or any combination thereof; and
    receiving, in the downlink control information, a flag of one or more bits associated with the first device, an indication of a paging identifier associated with the first device, an indication of paging search space associated with the first device, an indication of one or more paging occasions associated with the first device, or any combination thereof,
    wherein the flag, the indication of the paging identifier, the indication of the paging search space, the indication of the one or more paging occasions, or any combination thereof is included in a short message of the downlink control information, and wherein the indication of the one or more paging occasions is based at least in part on a state of the first device, the state of the first device comprising an idle state, an inactive state, or a connected state.

13. The method of claim 1, wherein the indication of the system information update in the downlink shared channel comprises scheduling information associated with an updated system information message.

14. The method of claim 1, wherein the first device is associated with a first type of devices associated with a first type of service different than a second type of devices associated with a second type of service, wherein a type of a device is based at least in part a class of the device, a category of the device, a mobility of the device, or a capability of the device, or any combination thereof.

15. A method for wireless communication at a second device, comprising:
    establishing a communication link with a group of devices;
    determining a system information update for a first device in the group of devices based at least in part on establishing the communication link;
    transmitting, to the first device based at least in part on determining the system information update, downlink control information in a downlink control channel and a message in a downlink shared channel, the message comprising an indication of a system information update for the first device and one or more updated system information elements that are associated with a cell selection parameter, a cell re-selection parameter, a cell measurement parameter, or any combination thereof; and
    communicating with the first device in the group of devices based at least in part on transmitting the downlink control information and the indication of the system information update in the message.

16. The method of claim 15, wherein transmitting the indication of the system information update in the message comprises:
    transmitting a flag of one or more bits.

17. The method of claim 15, wherein transmitting the indication of the system information update comprises:
    transmitting an indication of one or more system information blocks updated.

18. The method of claim 15, wherein transmitting the indication of the system information update comprises:
    transmitting an indication that one or more system information elements updated are associated with a plurality of system information blocks.

19. The method of claim 15, wherein transmitting the indication of the system information update comprises:
    transmitting, in a payload on the downlink shared channel, one or more system information parameters updated, wherein the one or more system information parameters updated comprise one or more configuration parameters associated with a random access procedure.

20. The method of claim 15, wherein transmitting the downlink control information comprises:
    transmitting a second indication of the system information update, and wherein determining the system information update for the first device is based at least in part on transmitting the indication of the system information update in the downlink control information.

21. The method of claim 20, wherein transmitting the indication of the system information update for the first device in the message comprises:
    transmitting a flag of one or more bits, transmitting an indication of one or more system information blocks updated, transmitting an indication of one or more system information elements updated, or transmitting, in a payload on the downlink shared channel, one or more system information parameters updated, or any combination thereof.

22. The method of claim 20, wherein:
    transmitting the second indication of the system information update in the downlink control information comprises transmitting the indication of the system information update in a short message of the downlink control information.

23. The method of claim 15, wherein transmitting the indication of the system information update comprises:
    transmitting the indication of the system information update in a field in the message; and
    transmitting an identifier associated with the field in the message, the identifier assigned to one or more devices in the group of devices including being assigned to the first device as one of the one or more devices in the group of devices.

24. The method of claim 23, further comprising:
    determining that the identifier associated with the field is assigned to the first device based at least in part on a class of the first device, a category of the first device, a mobility of the first device, a capability of the first device, or any combination thereof.

25. The method of claim 23, where transmitting the indication of the system information update in the field or a second field in the message comprises:
    transmitting a second identifier associated with the field or the second field in the message, the second identifier assigned to one or more devices in a second group of devices including being assigned to the first device as one of the one or more devices in the second group of devices.

26. The method of claim 15, wherein transmitting the indication of the system information update comprises:
    transmitting, in the message, an indication of one or more system information blocks updated, an indication of one or more system information elements updated, one or more system information parameters updated, or any combination thereof; and
    transmitting, in the downlink control information, a flag of one or more bits associated with the first device, an indication of a paging identifier associated with the first device, an indication of paging search space associated with the first device, an indication of one or more paging occasions associated with the first device, or any combination thereof,
    wherein the flag, the indication of the paging identifier, the indication of the paging search space, the indication of the one or more paging occasions, or any combination thereof is included in a short message of the downlink control information, and
    wherein the indication of the one or more paging occasions is based at least in part on a state of the first device, the state of the first device comprising an idle state, an inactive state, or a connected state.

27. The method of claim 15, wherein the indication of the system information update in the downlink shared channel comprises scheduling information associated with an updated system information message.

28. The method of claim 15, wherein the first device is associated with a first type of devices associated with a first type of service different than a second type of devices associated with a second type of service, wherein a type of a device is based at least in part a class of the device, a category of the device, a mobility of the device, or a capability of the device, or any combination thereof.

29. An apparatus for wireless communication at a first device, comprising:
  a processor,
  memory coupled with the processor; and
  instructions stored in the memory and executable by the processor to cause the apparatus to:
    establish a communication link with a second device;
    receive, from the second device based at least in part on establishing the communication link, downlink control information in a downlink control channel and a message in a downlink shared channel, the message comprising an indication of a system information update for the first device and one or more updated system information elements that are associated with a cell selection parameter, a cell re-selection parameter, a cell measurement parameter, or any combination thereof;
    determine the system information update for the first device based at least in part on receiving the downlink control information and the indication of the system information update in the message;
    update system information for the first device based at least in part on determining the system information update; and
    communicate with the second device based at least in part on updating the system information.

30. An apparatus for wireless communication at a second device, comprising:
  a processor,
  memory coupled with the processor; and
  instructions stored in the memory and executable by the processor to cause the apparatus to:
    establish a communication link with a group of devices;
    determine a system information update for a first device in the group of devices based at least in part on establishing the communication link;
    transmit, to the first device based at least in part on determining the system information update, downlink control information in a downlink control channel and a message in a downlink shared channel, the message comprising an indication of a system information update for the first device and one or more updated system information elements that are associated with a cell selection parameter, a cell re-selection parameter, a cell measurement parameter, or any combination thereof; and
    communicate with the first device in the group of devices based at least in part on transmitting the downlink control information and the indication of the system information update in the message.

* * * * *